United States Patent
Trickel

(10) Patent No.: US 7,933,790 B2
(45) Date of Patent: Apr. 26, 2011

(54) PAY REQUEST SYSTEM

(76) Inventor: John P. Trickel, Johnston, IA (US)

( * ) Notice: Subject to any disclaimer, the term of this patent is extended or adjusted under 35 U.S.C. 154(b) by 690 days.

(21) Appl. No.: 11/429,081

(22) Filed: May 5, 2006

(65) Prior Publication Data

US 2007/0260541 A1 Nov. 8, 2007

(51) Int. Cl.
G06F 9/44 (2006.01)
(52) U.S. Cl. .............................. 705/7; 705/1.1
(58) Field of Classification Search .............. 705/30, 705/35, 40, 7
See application file for complete search history.

(56) References Cited

U.S. PATENT DOCUMENTS

| | | | | |
|---|---|---|---|---|
| 2005/0222923 | A1* | 10/2005 | Lambright | 705/30 |
| 2005/0289051 | A1* | 12/2005 | Allin et al. | 705/40 |
| 2006/0044307 | A1* | 3/2006 | Song | 345/419 |
| 2006/0085322 | A1* | 4/2006 | Crookshanks | 705/37 |
| 2006/0149687 | A1* | 7/2006 | McLemore | 705/400 |

OTHER PUBLICATIONS

Runge et al., "The Management of Business Transaction through Electronic Contracts", Proceedings, Tenth International Workshop of Database and Expert Systems Applications, 1999.*

* cited by examiner

Primary Examiner — Romain Jeanty
Assistant Examiner — Thomas Mansfield
(74) Attorney, Agent, or Firm — BrownWinick Law Firm

(57) ABSTRACT

This web enabled system is capable of facilitating the management of unlimited projects within which an unlimited number of parties may participate to complete an unlimited number of stages, substages and tasks. The system facilitates the efficient disbursal of monies while reducing the inefficiencies that result when money is not timely disbursed. It uses a quasi-escrow system to secure waivers and distribute money simultaneously. Projected timelines for completion, tracking of materials used and materials stored, and partial payments and releases are all managed by the system based on inputs by participating parties. Allowed inputs are governed by each party's function and the password security level provided therefore, in balance with checks against required approvals or releases by other affected parties and intrasystem consistency checks.

16 Claims, 33 Drawing Sheets

Figure 1:
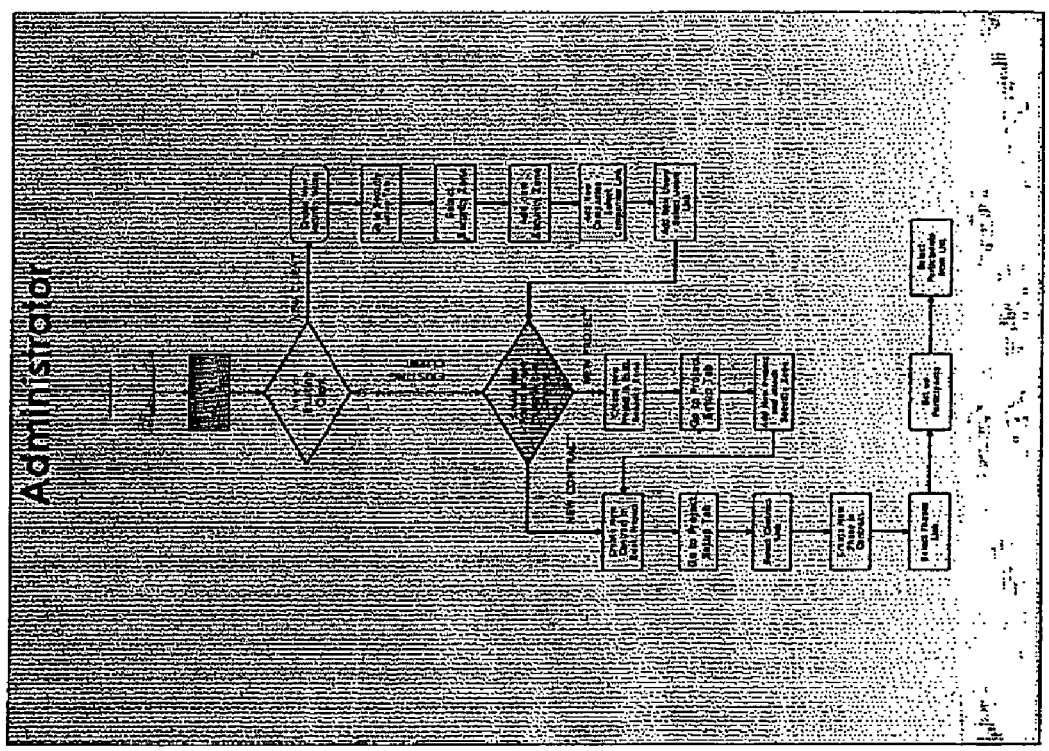

| | BUILDER | DESCRIPTION |
|---|---|---|
| | Builders Inc. | This is a sample project |
| | Central Kitchen | Central Kitchen (Old Project ID:50) |
| | East High Community Center | East High Community Center (Old Project ID:87) |
| | East High School | East High School (Old Project ID:5) |
| | Goodrell Middle School | Goodrell Middle School (Old Project ID:61) |
| | Granger-Mitchell Elementary School | Granger-Mitchell Elementary School |
| | Howe Elementary School | Howe Elementary School (Old Project ID:65) |
| | Hubbell Elementary School | Hubbell Elementary School (Old Project ID:9) |
| | John Test Project | |
| | Lincoln High School | Lincoln High School (Old Project ID:21) |
| | Longfellow-Wallace Elementary School | Longfellow-Wallace Elementary School (Old Project ID:75) |
| | Mike Test Project | Test Project |
| | North High School | North High School |
| | Perkins Elementary School | Perkins Elementary School (Old Project ID:66) |
| | Phillips Elementary School | Phillips Elementary School (Old Project ID:19) |
| | Roosevelt High School | Roosevelt High School (Old Project ID:53) |
| | Steve's Project 1 | Test Project |
| | Stowe Elementary School | Stowe Elementary School (Old Project ID:77) |
| | TEST PROJECT | Test Project |

© ezPay LLC, All Rights Reserved

Fig. 5b

EDIT USER PROFILE

First name: John  Middle:
Last Name: Trickel
Position: CEO
Company: VGI Design  Add company...
Mobile phone: 515-554-3812
Work phone: 515-270-2530  Ext:
Fax: 515-270-2540
Email: mike@vesey.com
Address: 5525 Meredith Drive
Address (cont.): Suite F
City: Des Moines  State: Iowa
Country: United States
Postal code: 50310
Logon ID: johnt
Initial password: 1234
Global role: Administrator Associated with these security zones: DMPS
Available security zones: ezTest Add Security Zone...

Created by Super Administrator (2/19/2005 5:40:23 PM)
Last updated by Super Administrator (9/12/2005 9:14:29 PM)

Fig. 5e

```
╔══════════════════════════════════════════════════════════════╗
║ http://dev.vesey.com - Edit Company Profile - Microsoft Internet Explorer   [_][□][X] ║
╠══════════════════════════════════════════════════════════════╣
║                                                              ║
║           EDIT COMPANY PROFILE      [ Save ] [ Close ] [ Add New ] ║
║                                                              ║
║   Company name: [VGI Design                  ]               ║
║        Address: [5525 Meredith Drive         ]               ║
║  Address (cont.): [Suite C                   ]               ║
║           City: [Des Moines                  ]               ║
║  State (US only): [Iowa        ▼]                            ║
║        Country: [United States              ▼]               ║
║    Postal code: [50310        ]                              ║
║     Main phone: [515-270-2530 ]                              ║
║            Fax: [515-270-2540 ]                              ║
║        Website: [http://www.vgidesign.com    ]               ║
║                                                              ║
║         Created by Super Administrator (2/19/2005 3:34:26 PM)║
║                                                              ║
╠══════════════════════════════════════════════════════════════╣
║ Done                                          ● Internet     ║
╚══════════════════════════════════════════════════════════════╝
```

Edit SOV Item - Microsoft Internet Explorer

Division: 03100
Work Description: Concrete Forms and Accessories
Type: Labor
Scheduled Value [C]: $2,400,000.00
From Previous Application [D + E2]: $0.00
This Period [E1, not in F3]: 1500000 or 62.50 %
This Period [E2]: $1,500,000.00
Previous Materials Stored [F1]: $0.00
New Materials Stored [F2, not in D or E]: $0.00 or 0.00 %
Previously Stored Materials Used [F3, not in E1]: $0.00 or 0.00 %
Presently Stored Materials [F4 = F1 + F3 - F3]: $0.00
Total Completed and Stored To Date [G1 = D + E2 + F4]: $1,500,000.00
Percent Complete [G2 = G1/C]: 62.50 %
Balance To Finish [H = C - G1]: $900,000.00
Retainage [I]: $150,000.00

Save & Close   Close

Fig. 7b

Edit SOV Item - Microsoft Internet Explorer

Division: 03100
Work Description: Metal Doors and Frame
Type: Materials
Scheduled Value [C]: $1,500,000.00
From Previous Application [D + E2]: $0.00
This Period [E1, not in F3]: 500000.00 or 33.33 %
This Period [E2]: $500,000.00
Previous Materials Stored [F1]: $0.00
New Materials Stored [F2, not in D or E]: $250,000.00 or 16.67 %
Previously Stored Materials Used [F3, not in E1]: $0.00 or 0.00 %
Presently Stored Materials [F4 = F1 + F3 - F3]: $250,000.00
Total Completed and Stored To Date [G1 = D + E2 + F4]: $750,000.00
Percent Complete [G2 = G1/C]: 50.00 %
Balance To Finish [H = C - G1]: $750,000.00
Retainage [I]: $75,000.00

Save & Close   Close

Fig. 7c

Microsoft Internet Explorer

⚠ Please do not forget to upload reference documents for the materials stored!

OK

APPLICATIONS FOR PAYMENT IN PROGRESS:

| BUILDER | PROJECT | CONTRACT OR VENDOR | BALL IN COURT |
|---|---|---|---|
| Builders Inc. | Sample Building Project | City Electric | Approver |
| Central Kitchen | Design Pay App | Design Pay App | Originator |
| Central Kitchen | Equip Pkg 1 | Equip Pkg 1 | Administrator |
| Central Kitchen | Equipt Pkg 4 Baring | Equipt Pkg 4 Baring | Administrator |
| Central Kitchen | Equipt Pkg 4 Taylor | Equipt Pkg 4 Taylor | Administrator |
| Central Kitchen | Kitchen Consultant | Kitchen Consultant | Originator |
| East High Community Center | Design Contract | Design Contract | DMPS Accounting Approver |
| East High School | East Fire Alarm System | East Fire Alarm System | Architect Approver |
| East High School | East GC Phase | East GC Phase 01 | Originator |
| East High School | East GC Phase | East GC Phase 02 | Originator |
| East High School | East GC Phase | East GC Phase 03 | Originator |
| East High School | East GC Phase | East GC Phase 04 | Originator |
| East High School | East GC Phase | East GC Phase 05 | Originator |
| East High School | East GC Phase | East GC Phase 06 | Originator |
| East High School | East GC Phase | East GC Phase 07 | Originator |
| East High School | East GC Phase | East GC Phase 08 | Originator |
| East High School | East High Kitchen Equipment | East High Kitchen Equipment | TOK Administrator |
| Goodrell Middle School | Design Contract | Design Contract | Originator |
| Granger-Mitchell Elementary School | Design Contract | Design Contract | TOK Approver |

! - your action is required

© ezPay LLC, All Rights Reserved

Fig. 9a

| BUILDER | PROJECT | CONTRACT OR VENDOR |
|---|---|---|
| Builders Inc. | Sample Building Project | City Electric |
| Builders Inc. | Sample Building Project | Joes Construction |
| Central Kitchen | Design Pay App | Design Pay App |
| Central Kitchen | Equip Pkg 1 | Equip Pkg 1 |
| Central Kitchen | Equipt Pkg 2 and 3 | Equipt Pkg 2 and 3 |
| Central Kitchen | Equipt Pkg 4 Baring | Equipt Pkg 4 Baring |
| Central Kitchen | Equipt Pkg 4 Boelter | Equipt Pkg 4 Boelter |
| Central Kitchen | Equipt Pkg 4 Taylor | Equipt Pkg 4 Taylor |
| Central Kitchen | GC Pay Application | GC Pay Application |
| Central Kitchen | Kitchen Consultant | Kitchen Consultant |
| East High Community Center | Design Contract | Design Contract |
| East High School | East Fire Alarm System | East Fire Alarm System |
| East High School | East GC Phase | East GC Phase 01 |
| East High School | East GC Phase | East GC Phase 02 |
| East High School | East GC Phase | East GC Phase 03 |
| East High School | East GC Phase | East GC Phase 04 |
| East High School | East GC Phase | East GC Phase 05 |
| East High School | East GC Phase | East GC Phase 06 |

© ezPay LLC, All Rights Reserved

[ SCHEDULE OF VALUES ]

[ LIEN WAIVER ]

WAIVER OF LIEN
MATERIALS AND LABOR

| | |
|---|---|
| State of: | Iowa |
| County of: | Polk |
| Owner: | Sample Builder, 1111 44th St, Des Moines, Iowa 50233 |
| Property Address: | Building One<br>Des Moines, Iowa 50322 |
| Period Beginning: | 5/5/2006 12:00:00 AM |
| Period Ending: | 5/23/2006 12:00:00 AM |
| Project: | Sample Building Project |
| Lending Institution: | XYZ Bank<br>7000 University<br>Your City, State 55555 |

WHEREAS the undersigned has furnished labor, and/or materials, and/or services for construction, repair, reconstruction, or other services pursuant to a real estate improvement to the project: City Electric The undersigned, for and in consideration of $300,000.00 and other good and valuable considerations, the receipt whereof is hereby acknowledged, do(es) hereby waive and release to the extent only of such sum, paid simultaneously herewith, the lien or claim of, or right to file and establish a mechanic's lien against the above listed building/project and improvements, and the above described premises, given to me/us under the provisions of the statues and laws of the State of Iowa, relating to mechanic's liens on account of labor, or materials, or other services or any combination of labor, materials and services furnished by me/us for and on, the above mentioned building, project, and the above described premises, as of the above date.

☐ I approve this waiver.

Signed by: Joe Builder as Originator
Company: VGI Design
Position:
Work phone: 515-270-2530
Mobile phone:
Fax: 515-270-2540
Email: mike@vesey.com
Address: 5525 Meredith Drive, Des Moines, Iowa 50310
Signed on: 4/27/2006 7:58:19 AM

[ DIGITAL SIGNATURES ]

[ DOCUMENTATION ]

© ezPay LLC, All Rights Reserved

Fig. 9e

| | |
|---|---|
| This application is made for payment, as entered below, in connection with the Contract Continuation sheet attached. | |
| Payment application name: Application for Payment 0001 | PAYMENT APPLICATION PERIOD |
| Comments: | Period beginning: 5/18/2006 |
| Internal tracking number: | Period ending: 5/31/2006 |
| Owner Project Number: | |
| A/E Project Number: | PAYMENT APPLICATION STATUS |
| PO Number: | Original phase sum: $300,000.00 |
| Retainage (%): 0 | Net change by change orders: $0.00 |
| | Phase sum to date: $300,000.00 |
| | Total completed and stored to date: $0.00 |
| CHANGE ORDER SUMMARY | Total retainage: $0.00 |
| Previous additions: $0.00  Previous deductions: $0.00 | Total earned less retainage: $0.00 |
| Current additions: $0.00  Current deductions: $0.00 | Less previous certificates for payment: $0.00 |
| | Current payment due: $0.00 |
| Net changes by change orders: $0.00 | Balance to finish (incl. retainage): $300,000.00 |
| | Amount Certified: $0.00 |
| | Created by John Admin (4/27/2006 7:56:40 AM) |
| | Last updated by Joe Builder (4/27/2006 7:58:13 AM) |

⊞ SCHEDULE OF VALUES

⊞ LIEN WAIVER

⊞ DIGITAL SIGNATURES

The undersigned Contractor certifies that to the best of the Contractor's knowledge in accordance with the contract documents, that all amounts have been paid the Contractor for Work for which previous Certificates for Payment were issued and payments received from the Owner, and that current payment show herein is now due. Contractor certifies that the subcontractors have been paid within 30 days of the Contractor receiving payment from Owner.

Signed by: Joe Builder as Originator
Company: VGI Design
Position:
Work phone: 515-270-2530
Mobile phone:
Fax: 515-270-2540
Email: mike@vesey.com
Address: 5525 Meredith Drive, Des Moines, Iowa 50310
Signed on: 4/27/2006 7:58:13 AM

⊞ DOCUMENTATION

© ezPay LLC, All Rights Reserved

PAY REQUEST SYSTEM

FIELD OF INVENTION

Complex task management system for multiple parties providing multiple services or paying for them, in a multiple stage project including facilitation of partial payments and approvals therefore.

BACKGROUND OF THE INVENTION

Contracts pertaining to tasks and projects can involve multiple parties providing services, funding, and loan services and involve multiple stages with a host of imbedded timelines. Like dominoes, completion of the whole project depends on accurate performance of activities and timing that makes up the parts. Although all of this information can and has been tracked on paper or by computer in the past, "tracking" in the passive sense, did not provide the pro-active prompts necessary to keep a project moving toward completion nor a dynamic interface providing real time changes and interaction by participating parties.

The design and construction industries are highly fragmented and are riddled with inefficiencies, the largest one being how to get paid on a timely basis so that progress on the project can continue. There are conflicting interests relative to the signing of releases, provision of payment to subcontractors and vendors, and the distribution of money to contractors without a means to assure it is properly distributed to those needing payment. Generally, getting paid for services will require a contract and a schedule of values to invoice against over the contract period. The normal turn around time for partial payment in this environment can exceed 45 days, sometimes 90 days. Moreover, the process of requesting payment, obtaining approvals therefore, and transfer of funds is not consistent month to month. The number of man hours spent per year tracking documents necessary to effect all the partial payments in a large project is staggering. What was needed was a system accessible by all parties that could facilitate the dynamic management of the tasks, materials, and scheduling, and also provide a way to shorten the turn around time from bill to payment for recurring payments.

In addition to design and construction, facilities management, legal services, financial services, product development and manufacturing all present the same need i.e. the need to manage recurring payments for long term service contracts. This need requires a remedy for the exchange of money for services wherein money will only be paid upon release by the payee of any obligations to pay and the release will only be provided upon receipt of payment.

The objectives of the present invention are:

To provide a web-enabled pay application service to expedite, organize and synchronize the payment process between payors and service provides wherein each is a party to a contract.

To facilitate any contract for services that requires a recurring pay request, approval sequences and disbursements.

To automatically prepare, forward and execute an authorized lien waiver as part of the payment process;

To minimize the time and tasks presently required to obtain waivers and complete payments.

To reduce error associated with inaccuracies of multiple entries and recordkeeping, provide automatic email notification of process steps in the payment process, create a paperless process facilitated by digital signature sign-offs and provide password-keyed variable access to different parts of the system based on the identity and function of the party holding the password.

To allow full reporting capabilities to monitor on-going changes to schedule of values, budgets, completion, materials, etc.

To allow for multiple parties to integrate into a master pay request including sub contractors and vendors.

To provide a "bill pay" option to release funds to sub contractors or vendors.

BRIEF SUMMARY OF THE INVENTION

The present invention comprises a web enabled system capable of facilitating the management of unlimited projects within which an unlimited number of parties may participate to complete an unlimited number of stages, substages and tasks. The system facilitates the efficient disbursal of monies while reducing the inefficiencies that result when money is not timely disbursed. Projected timelines for completion, tracking of materials used and materials stored, and partial payments and releases are all managed by the system based on inputs by participating parties. Allowed inputs are governed by each party's function and the password security level provided therefore, in balance with checks against required approvals or releases by other affected parties and intrasystem consistency checks.

For example, a party providing drywall services may only be allowed access to the substages in which it is engaged to provide services and then, perhaps, only to certain fields relevant to reporting task completion, materials used, change requests, and payment requests. In contrast, a general contractor may have access to all substages but, although not allowed to input progress data regarding task completion by a subcontractor, will be required to approve the progress data input by that sub. A party providing finances for the project may have read-only access to the vast majority of the system's functions and have active access only to review, comment, approve, reject and actuate release of funds. The system here acts as the transfer agent for funds and waivers. The variations in accessibility are governed by password protected security levels.

As the project begins, each party from whom approval or signature will be required will agree that his signature be electronically applied upon his activation of a password-protected confirmation and that, upon such application, the electronic signature will be binding as if he had signed it physically.

The system is multi-relational such that a switch/flag/indicator can be set so that a change in a particular field will be reflected in another field or will be used to re-calculate a value in another field. For example, if a particular task cannot begin until a first task is completed, the system can be set so that if progress in the first task is slowed, the target dates of the other are changed accordingly, necessary and affected parties are so notified, and approval of the change it obtained from the approving party. Materials stored balances are maintained and "red flag" alerts are provided. This system is unique in that it tracks materials relative to the purchase date and use date of each particular lot of goods rather than storing a present inventory versus a total.

If a pay request goes without response, the system will email a reminder to the recipient of the request. For example, if a pay request is denied, the status of that request is presented to the requestor in a manner that draws its attention. As tasks or substages are completed for which partial payments are due, the appropriate party calls up a form pre-populated with substage information, enters the date and portion completed and requests payment. The system uses a predetermined authentication routine to deliver the request to a pre-determined approver or approvers. Prior to sending the pay request, the requester is presented with the digital Lien Waiver form with all relevant information about the request pre-populated. The form is generated by the system reflective of the pay request data and may only require the signor to actuate his electronic signature. The requestor must sign the Lien Waiver again to complete the pay request process. Requiring the signature at this point in time means the requestor completes all entries in the system at one time and simply waits to be paid. The electronically signed Lien Waiver is held by the system and can only be forwarded to the recipient when funds are forwarded to the requestor, or can be deleted if the request for payment is rejected. The Lien Waiver is otherwise inaccessible.

The approver then checks the work and approves (or disapproves) payment. As part of the approval process, the approver must also sign the pay request and the Lien Waiver as proof the Lien Waiver has indeed been reviewed. At this point, the system alerts the requester that approval was made. Then the system alerts the payor of the requested amount, its approval status, and of the completed lien waiver form. Payor releases funds to the system; the system verifies that the amount transferred matches that approved on the pay request, and then simultaneously sends the lien waiver form and the funds to the respective destinations. This negates the need for a double signature or temporary release form (one before payment received and a final one after) and ensures fast, reliable payment upon completion of Lien Waiver. When the system is set up to pay vendors and subcontractors as is preferable, the funds go directly to the recipient and do not get paid to the contractor's account wherein the contractor would be required to take additional steps to forward to the subcontractor or vendor.

In an alternative arrangement, once the requester receives funds, he can use a function similar to an online bank bill pay function to transfer funds for direct deposit to pay subcontractors or vendors that may not have been entered as pay requesters on the system.

Reports generated by the system upon command are many and varied. Running balances; retainage per task, substage, and overall; task completion reports; vendor status and service supplier status across tasks and subtasks; and Next Pay App reports are all available and can be set to autogenerate at predetermined times or on command. In addition, the system stores and makes available read-only copies of project documents (e.g., subcontracts, vendor agreements, lender documents, and others).

DETAILED DRAWINGS

Figure 2:
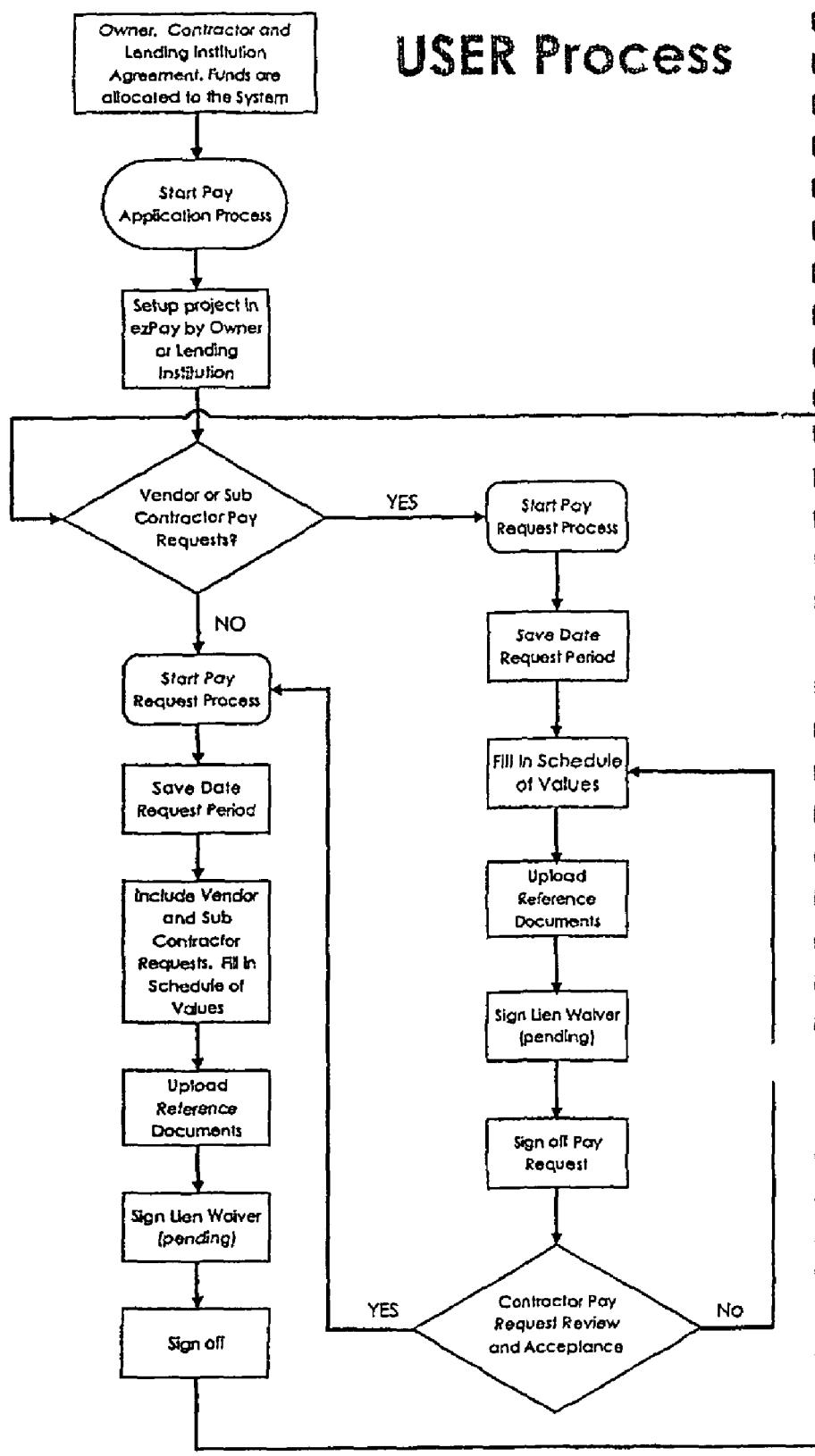
Figure 3:
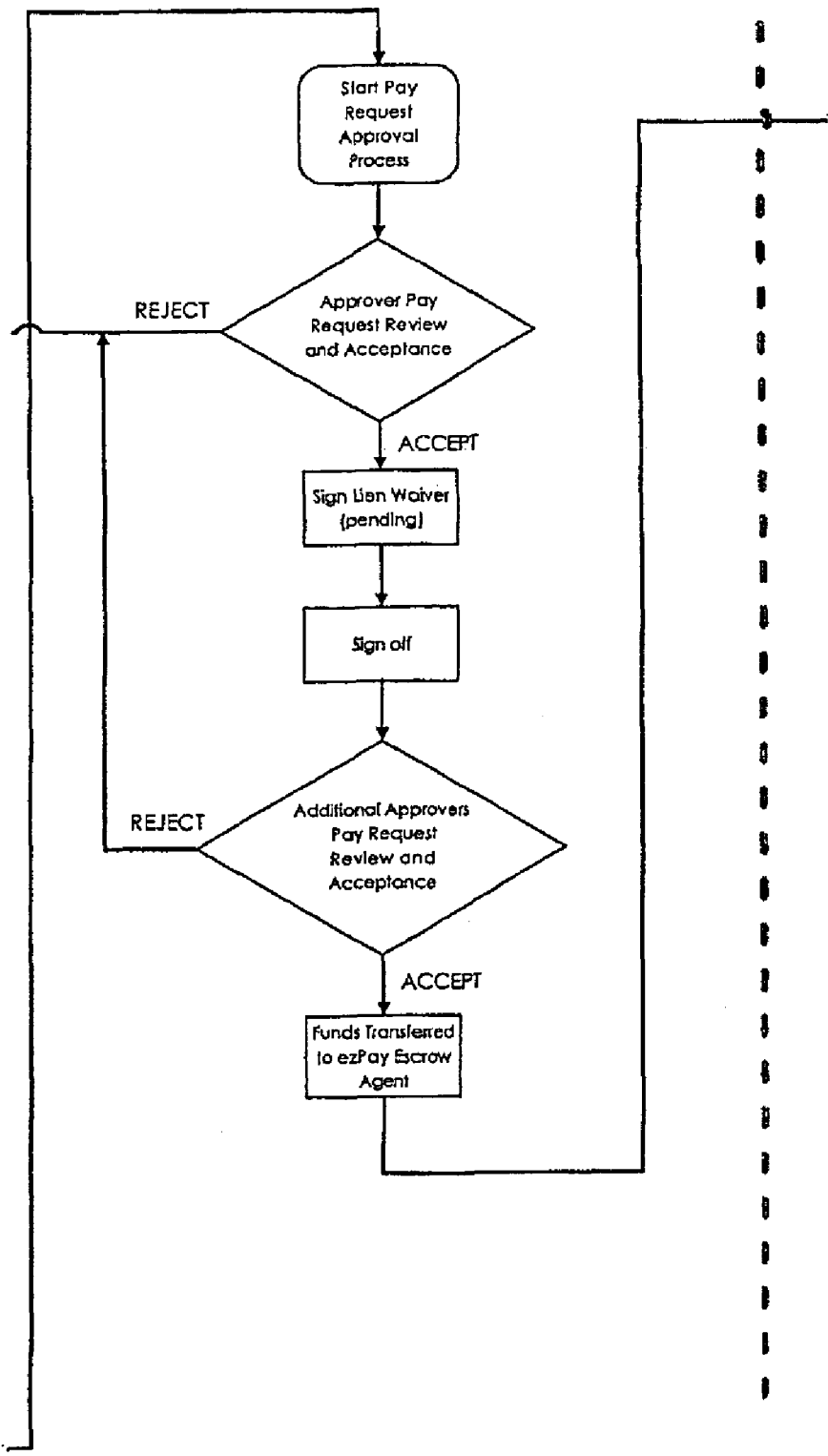
Figure 4:
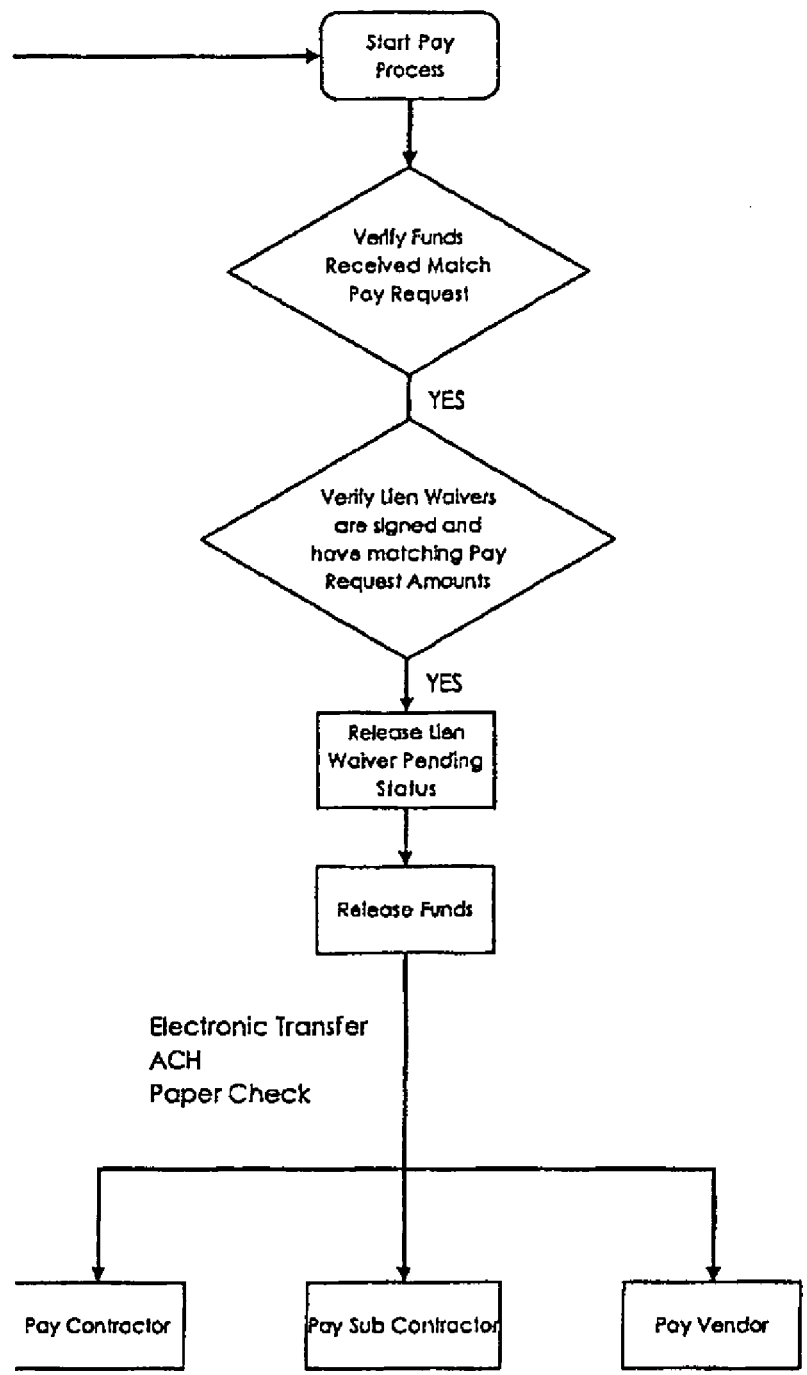
Figure 5:
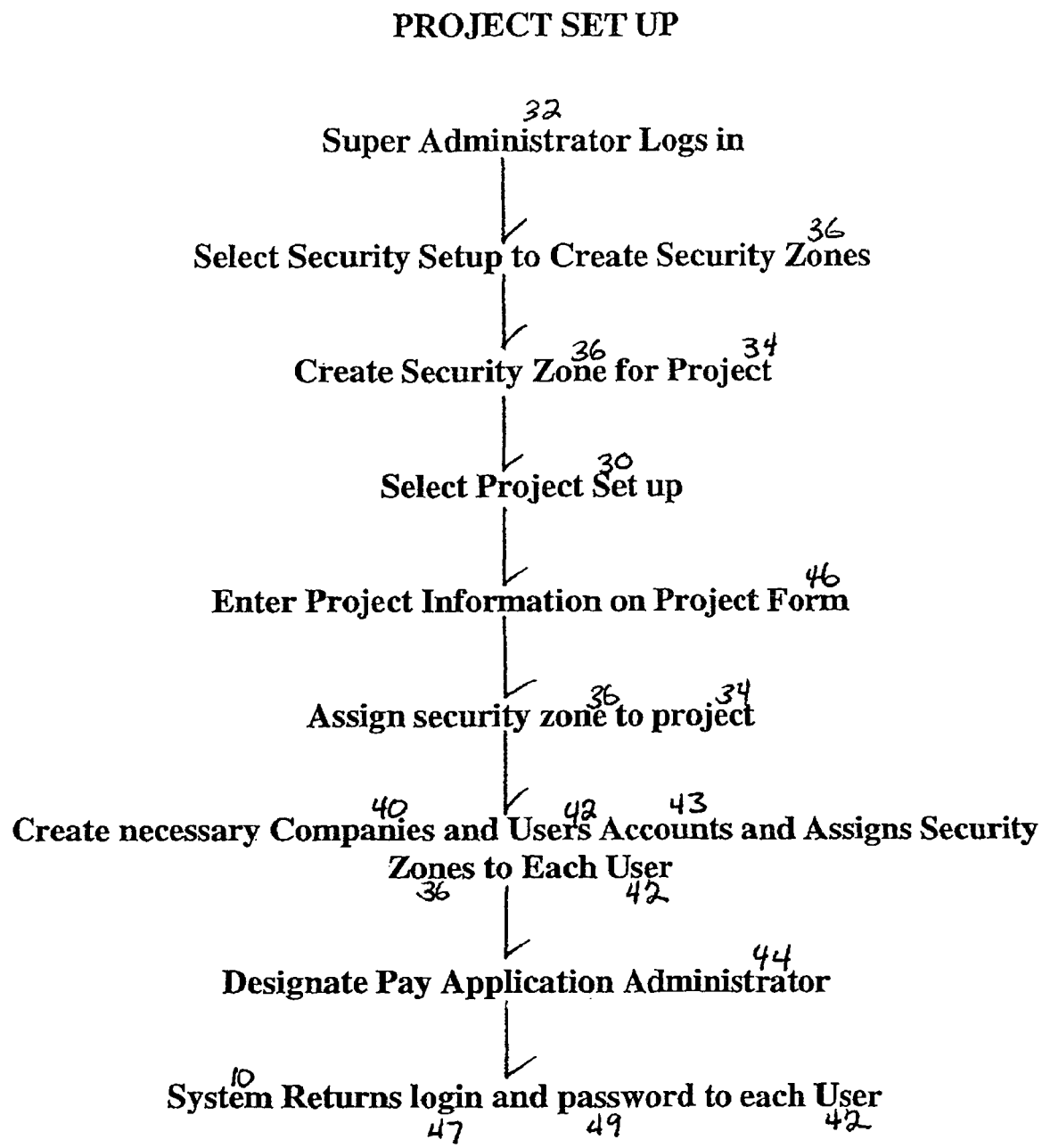
Figure 5A:
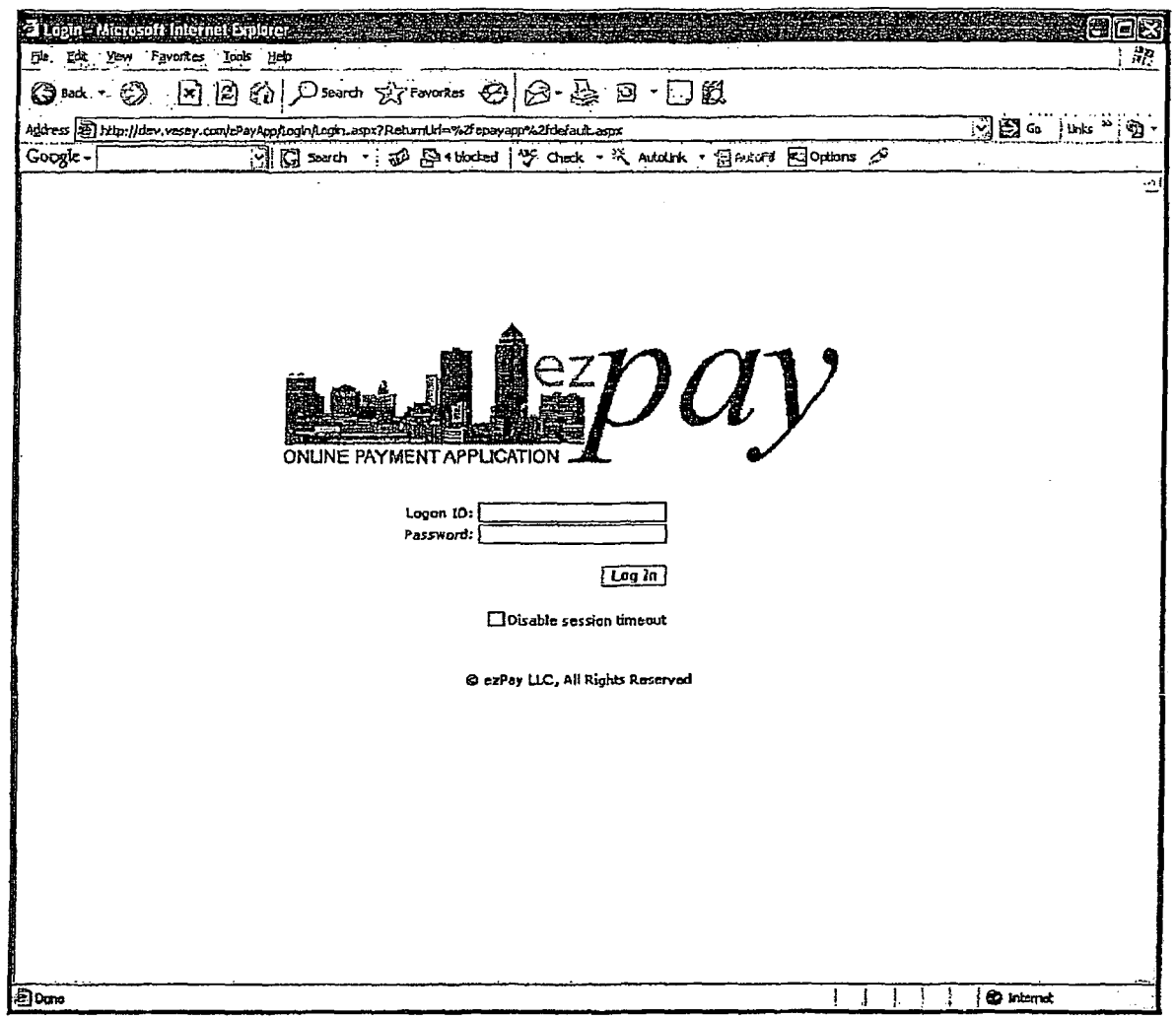
Figure 5C:
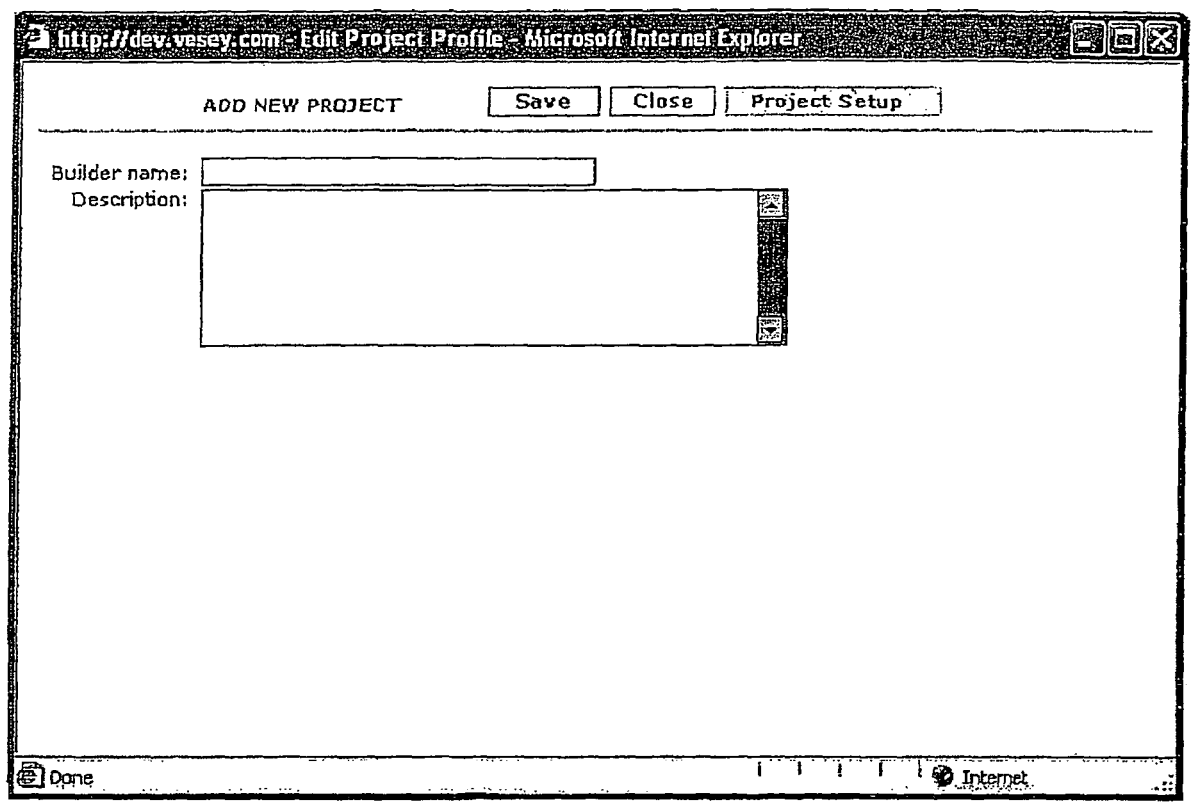
Figure 5D:
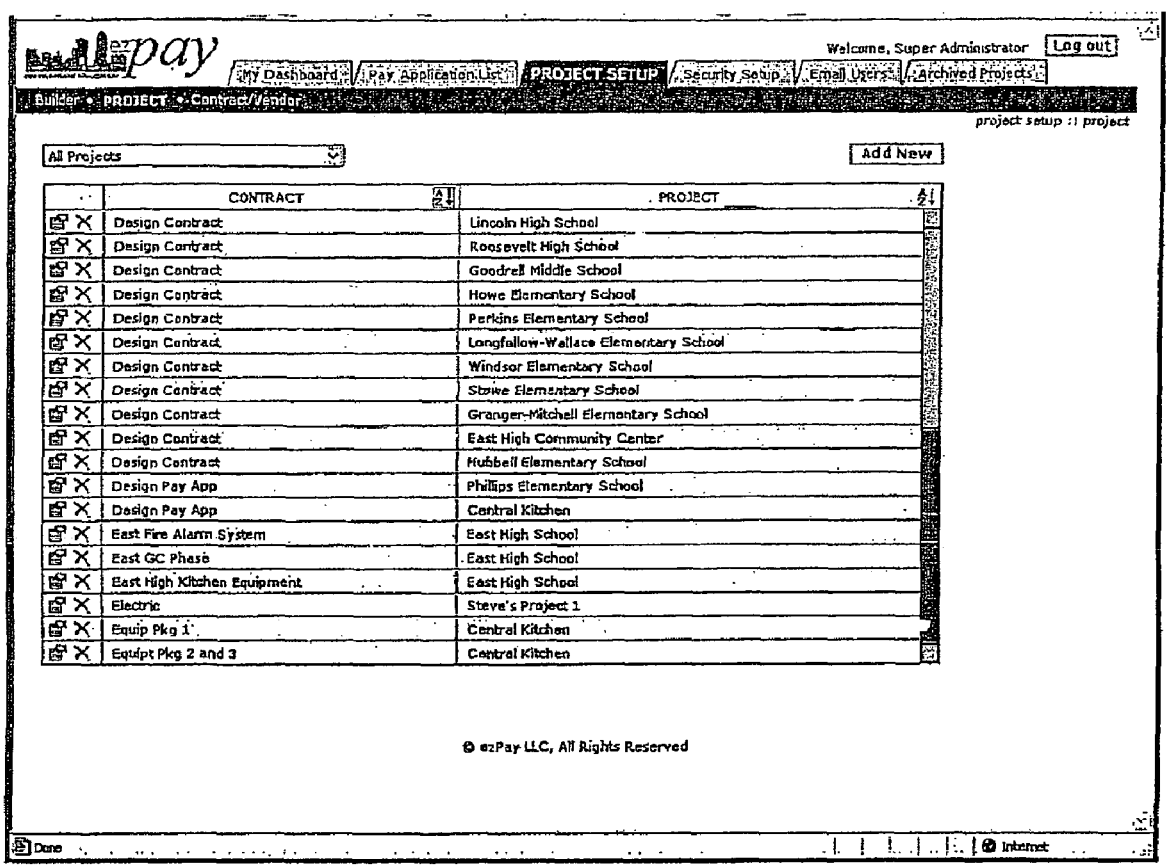
Figure 5F:
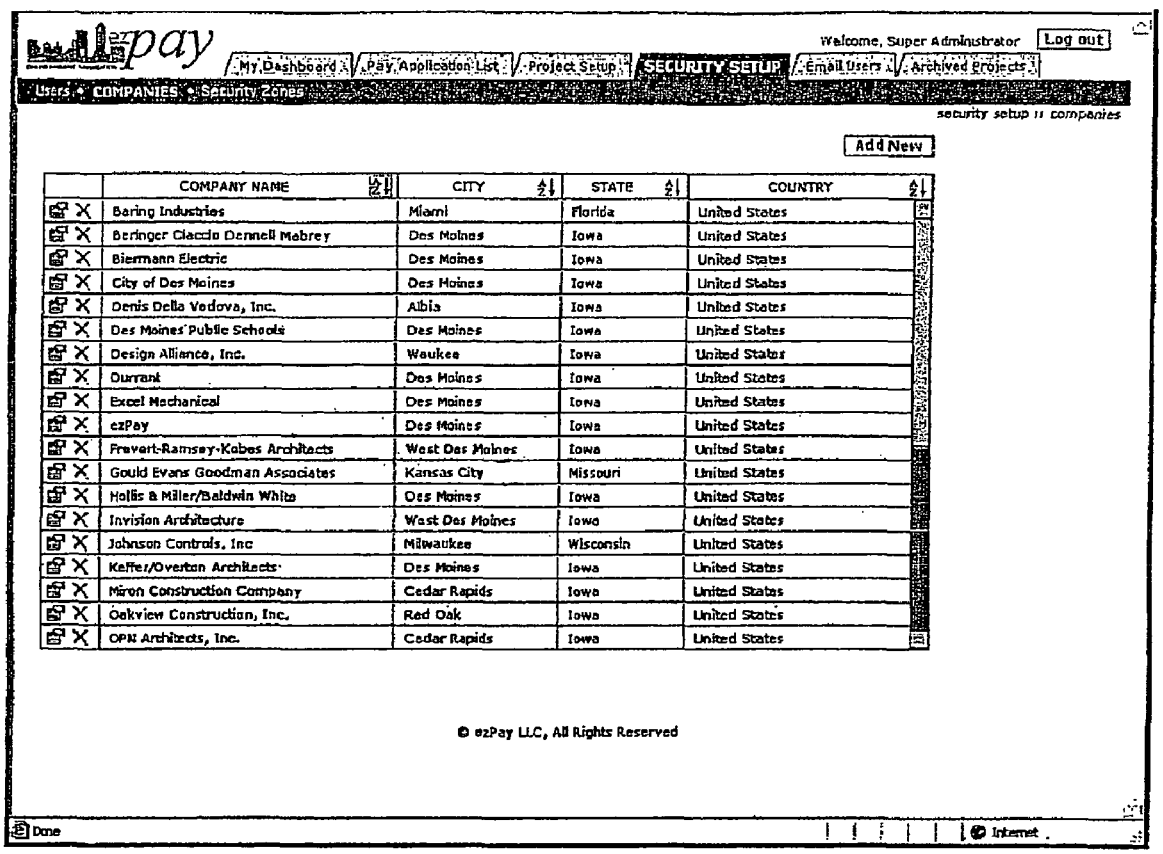
Figure 5H:
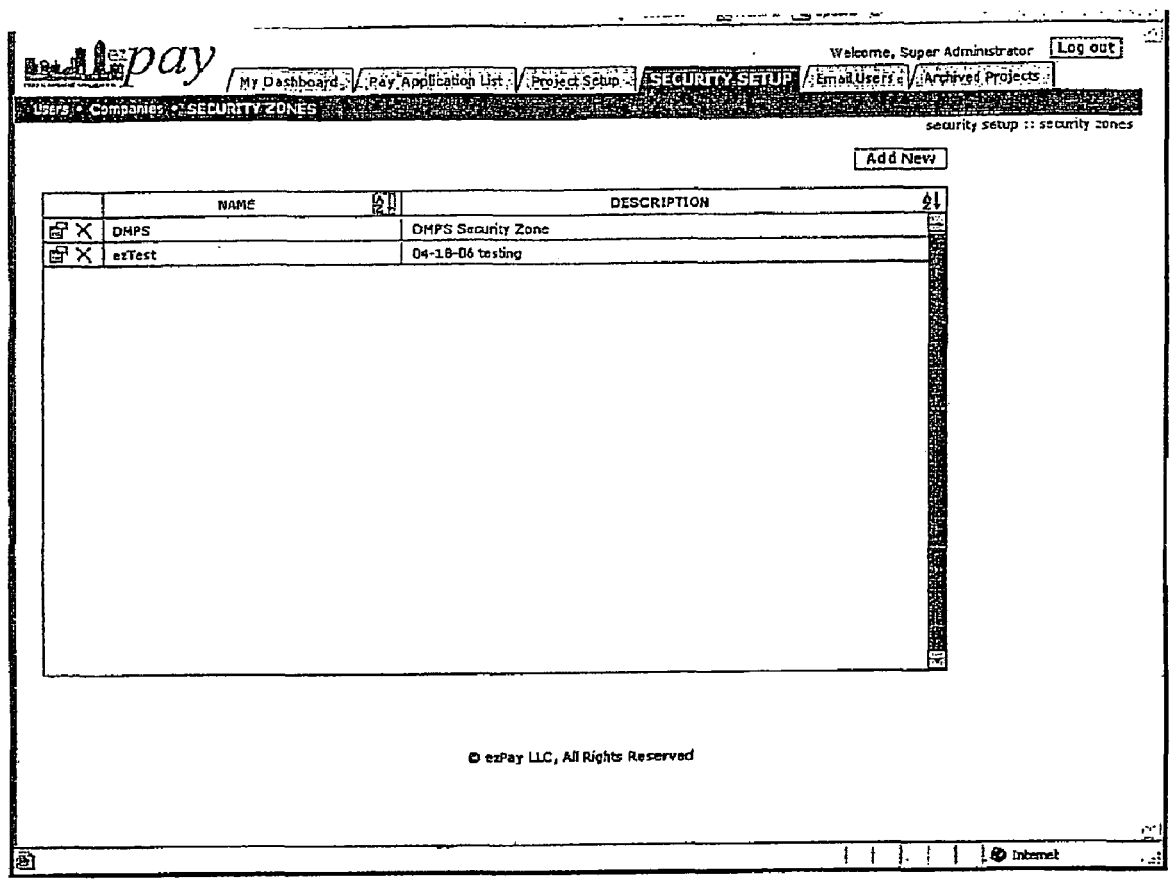
Figure 5I:
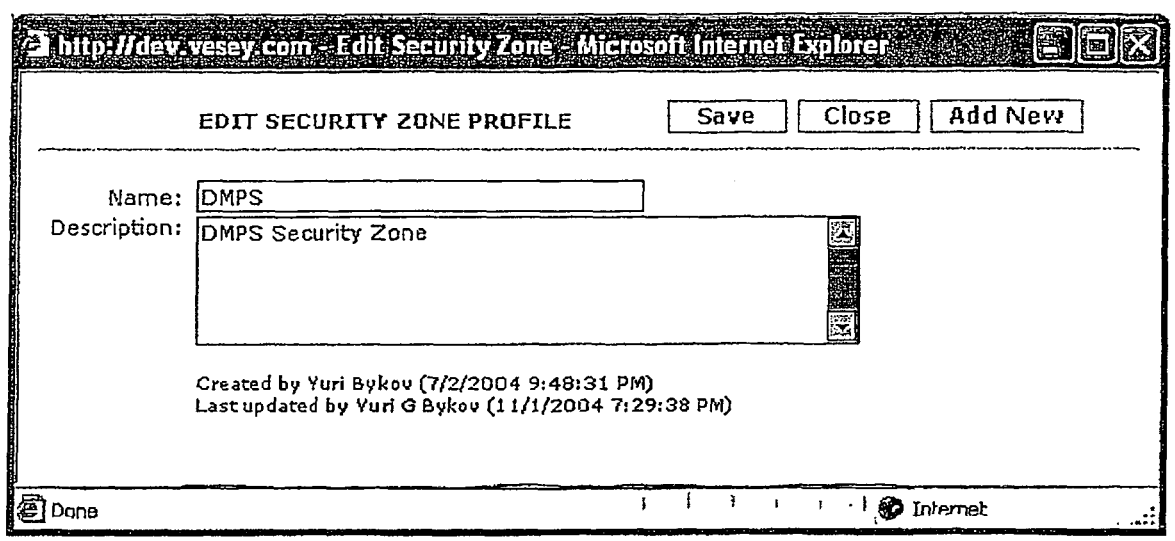
Figure 5J:
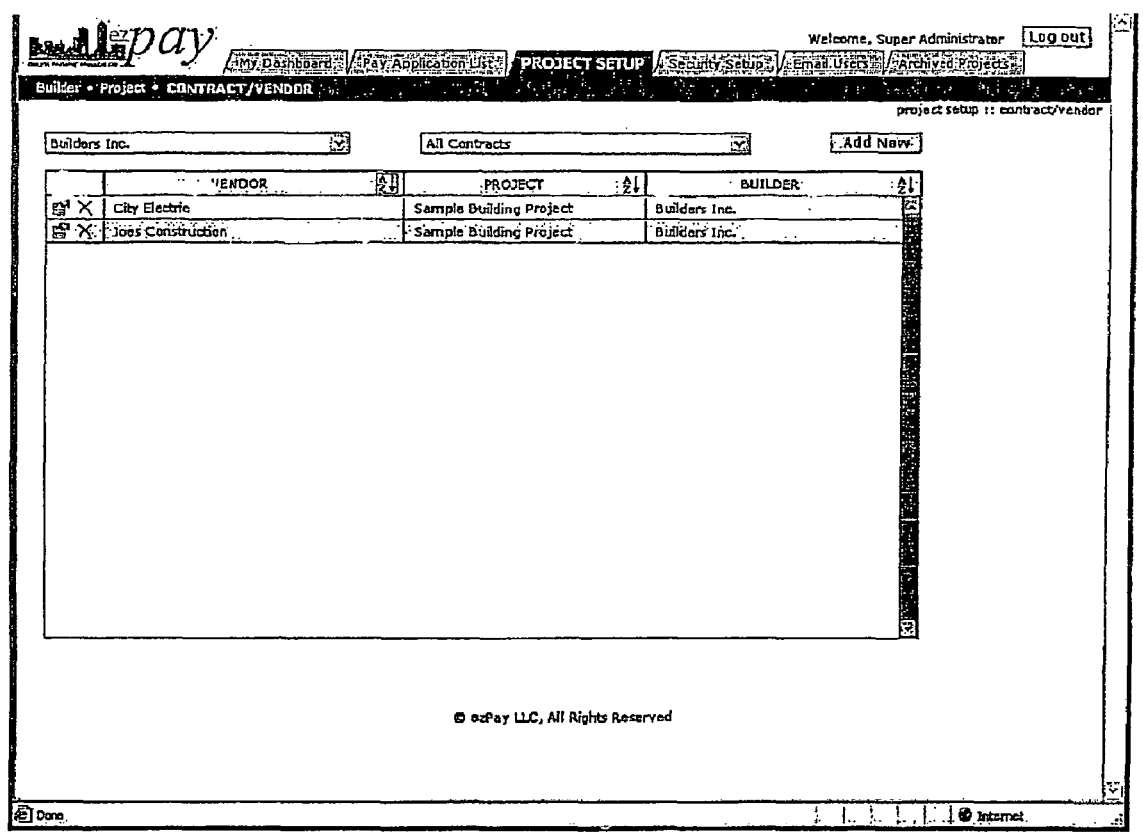
Figure 6:
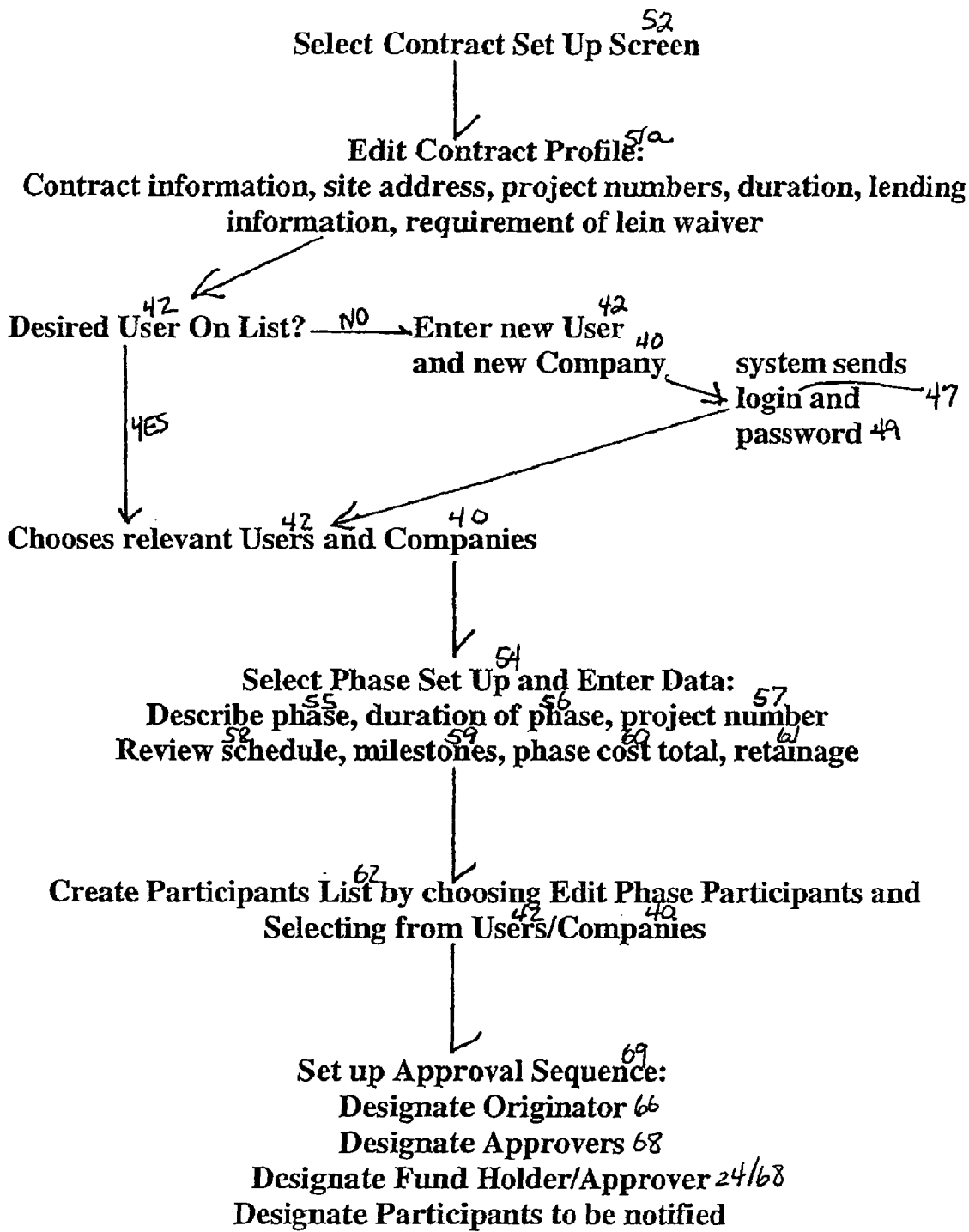
Figure 6A:
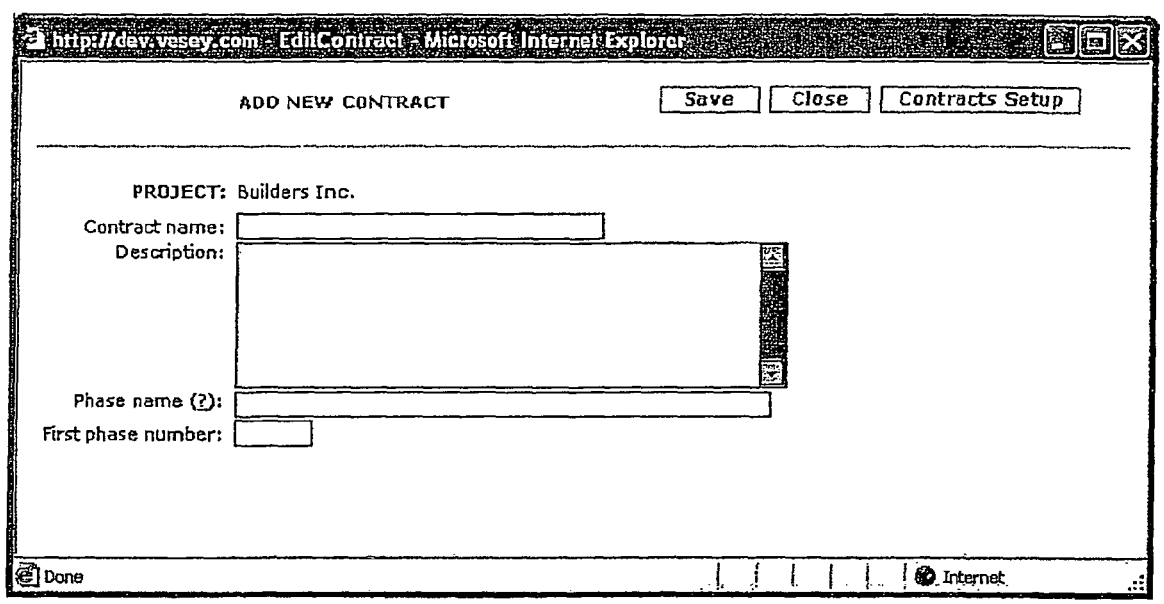
Figure 6B:
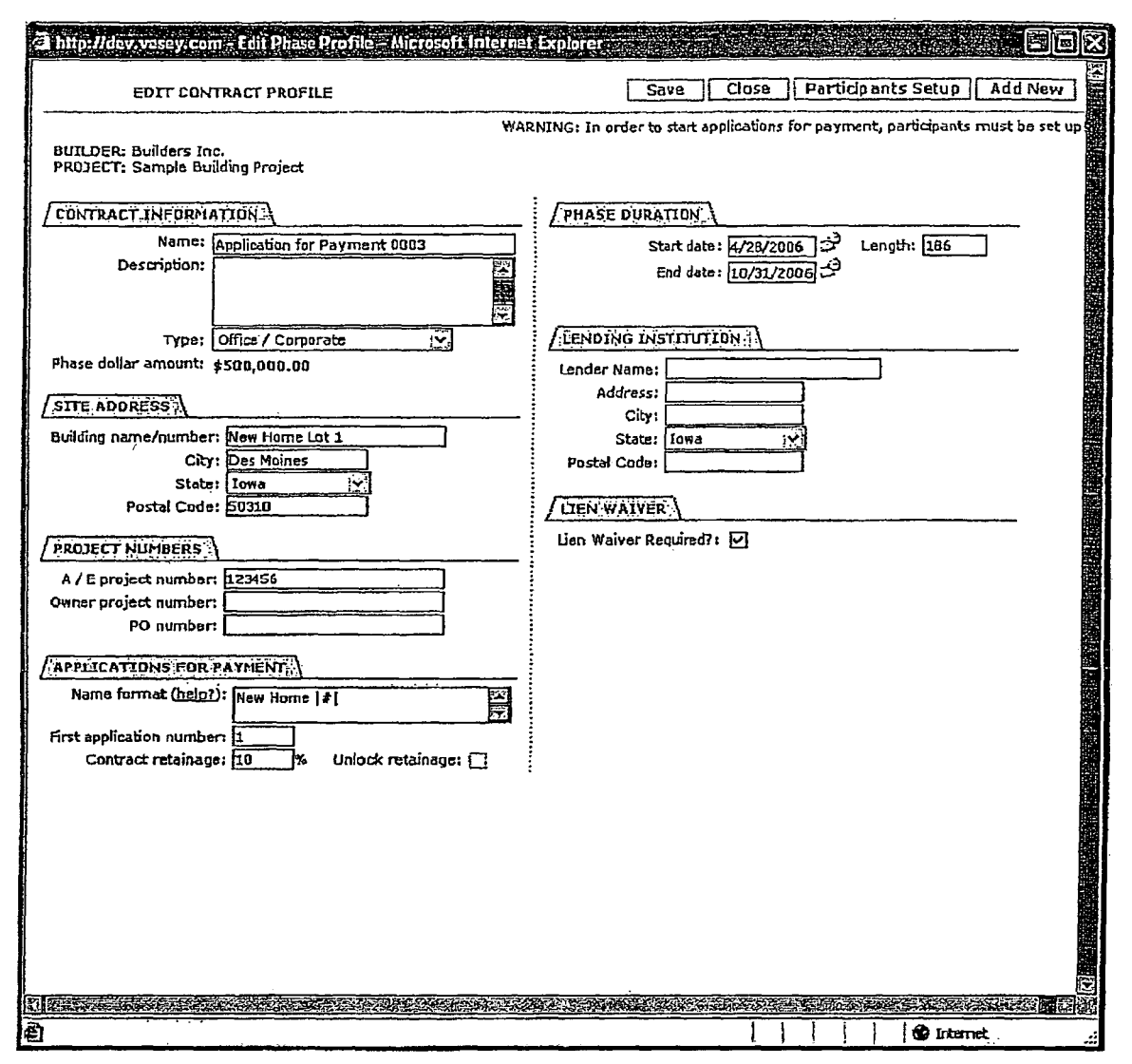
Figure 6C:
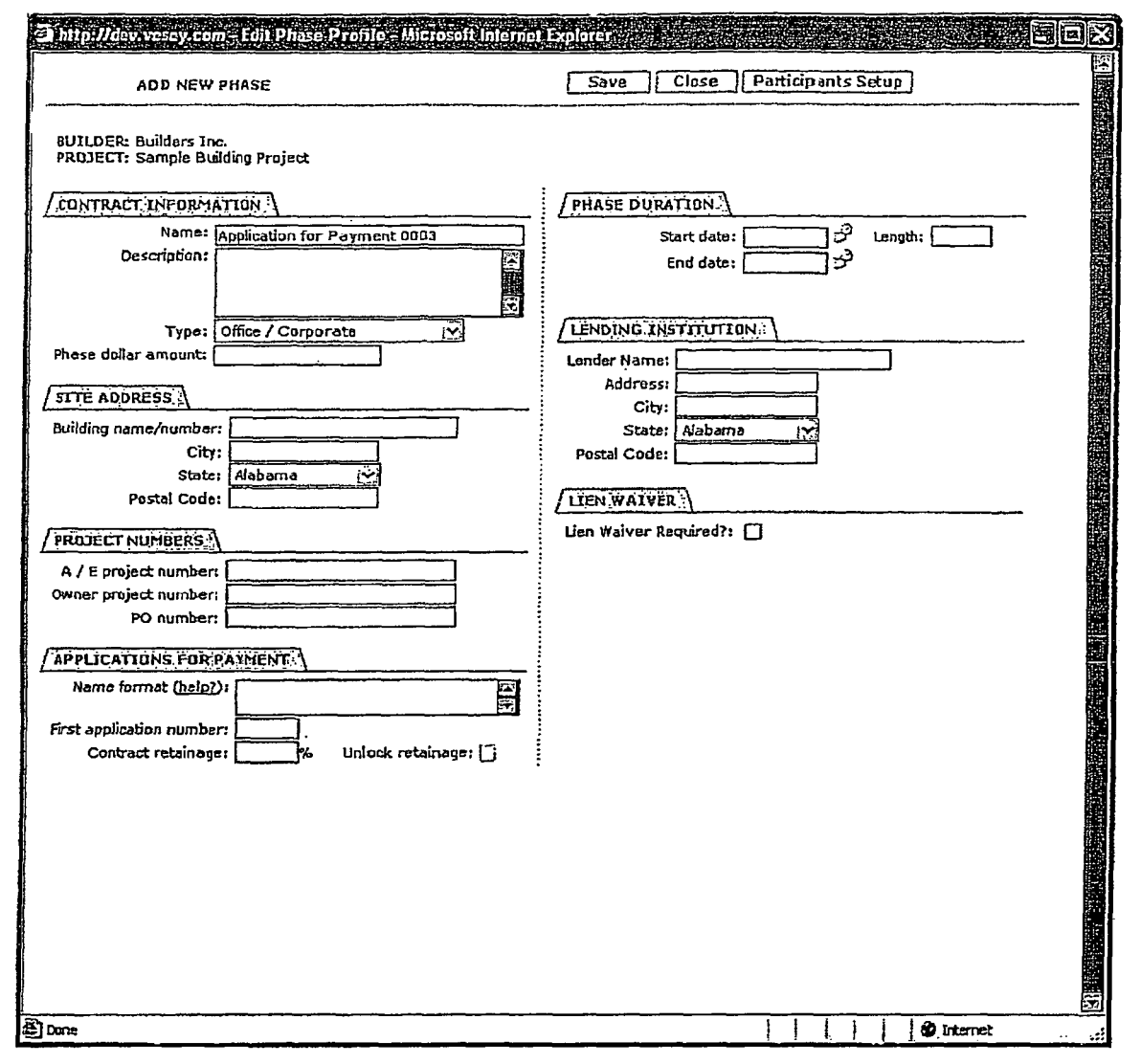
Figure 6D:
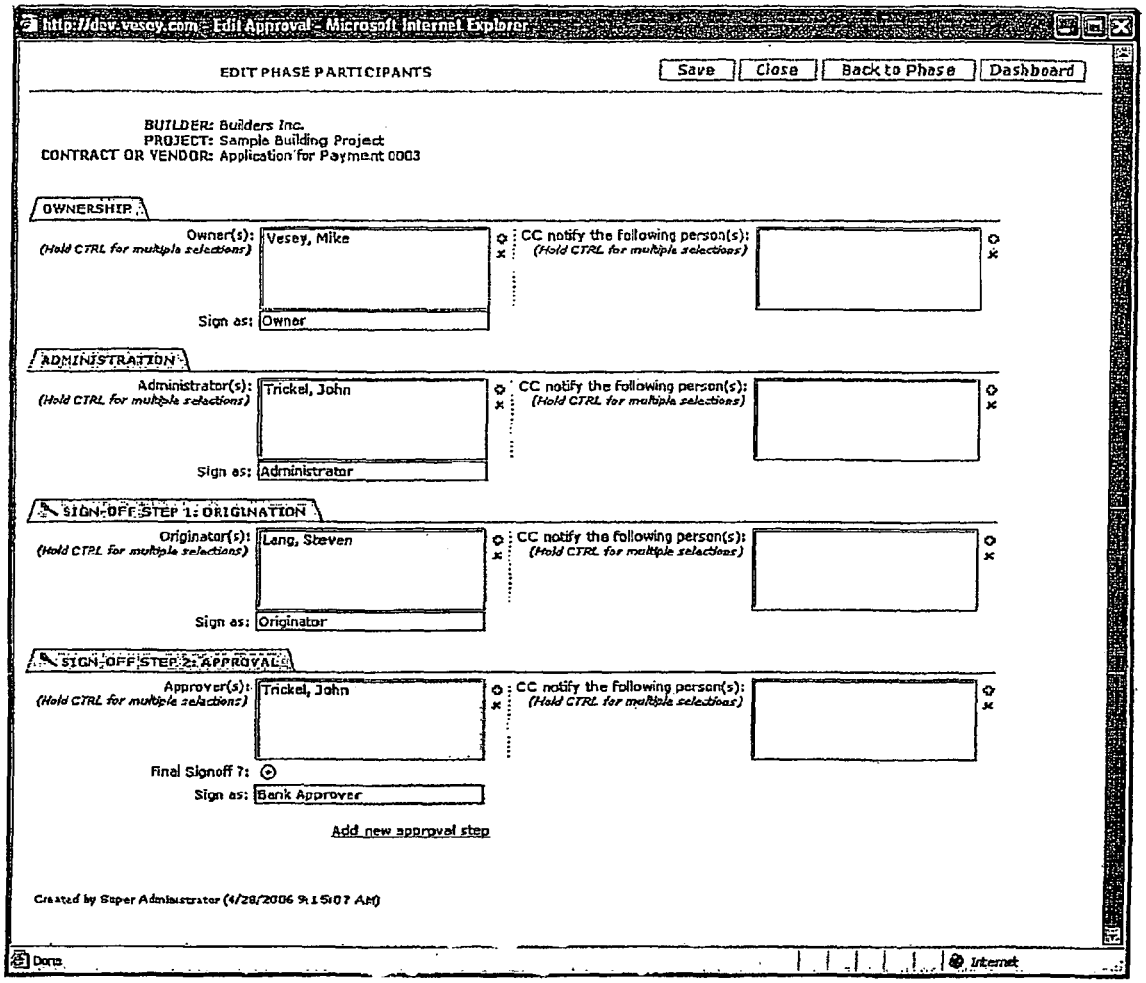
Figure 7:
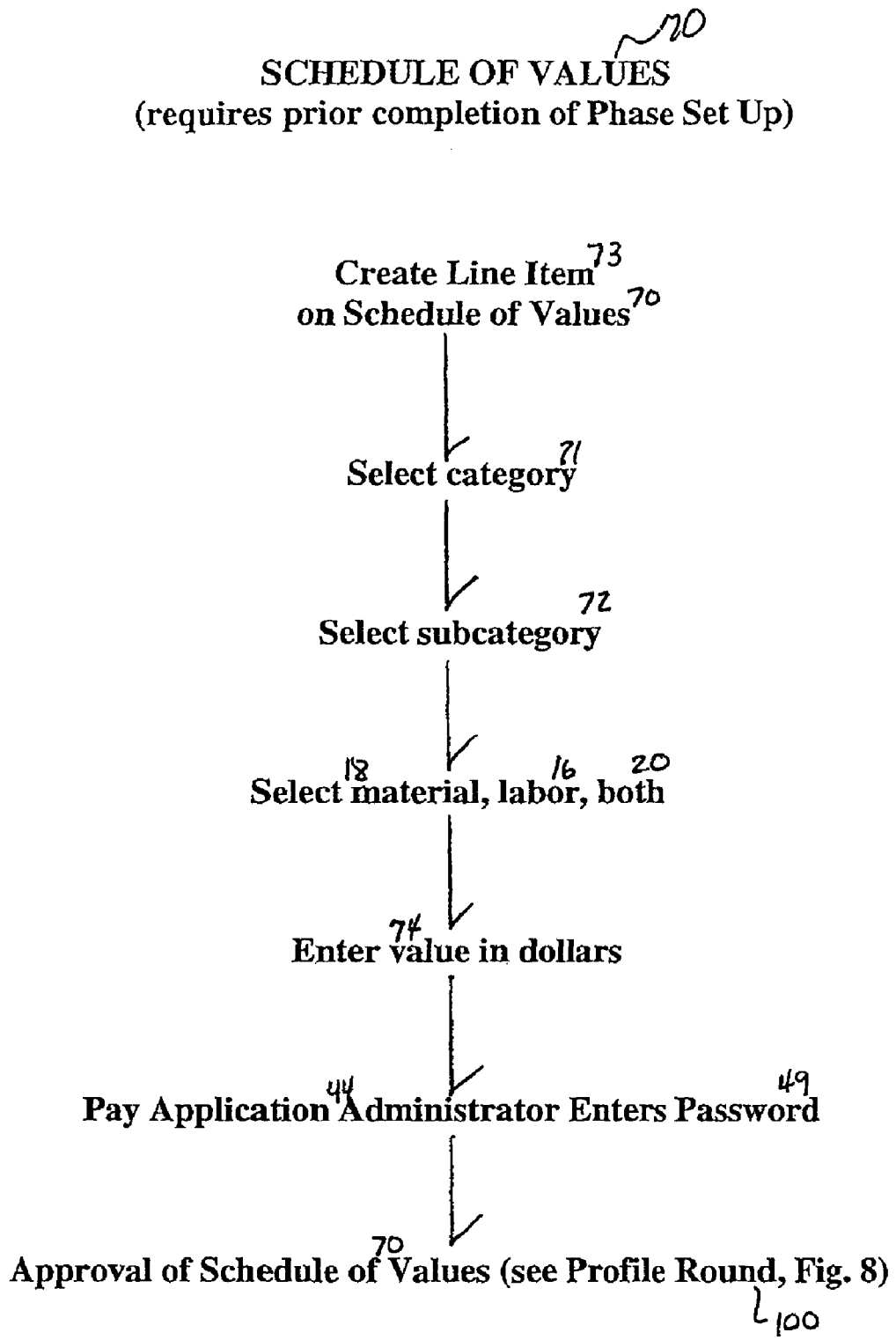
Figure 7A:
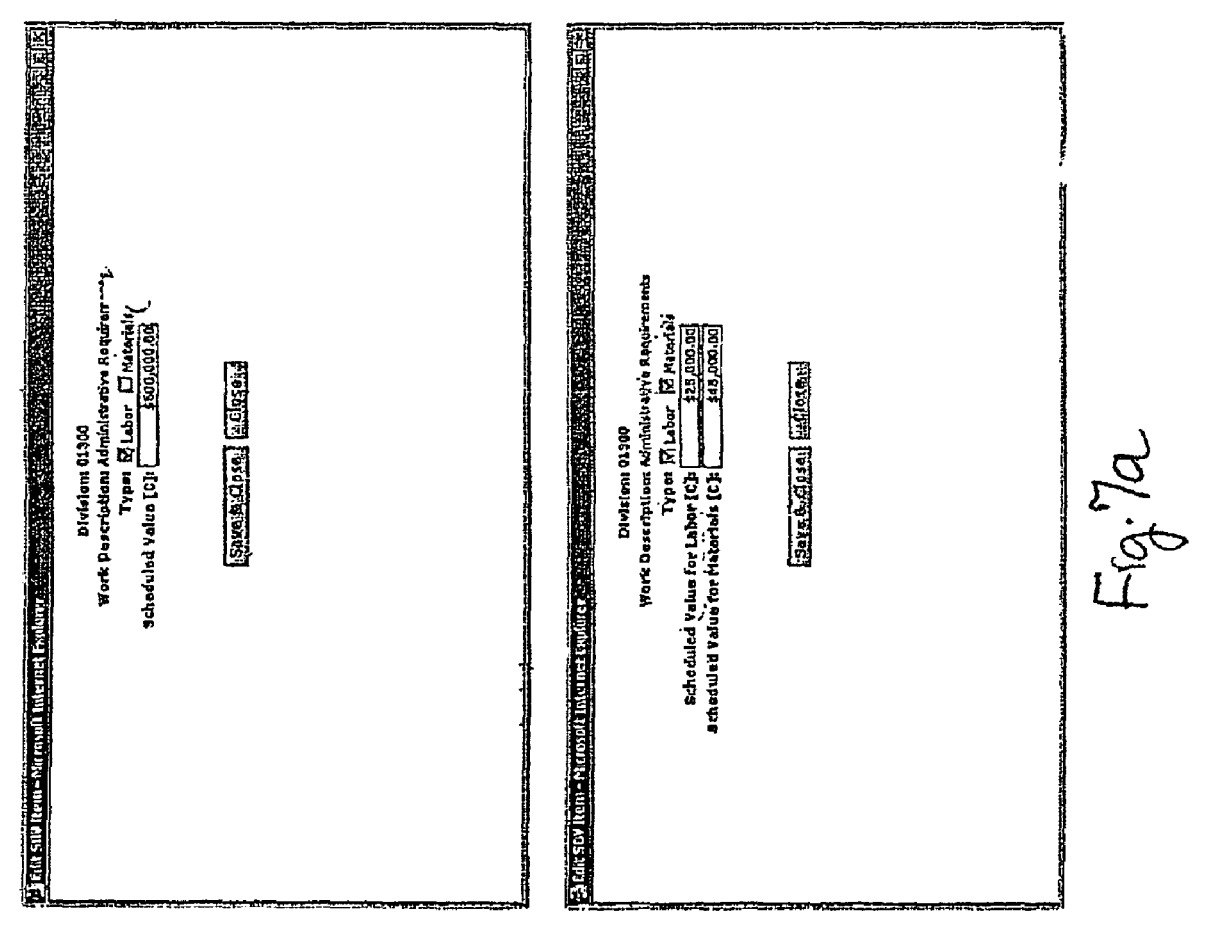
Figure 8:
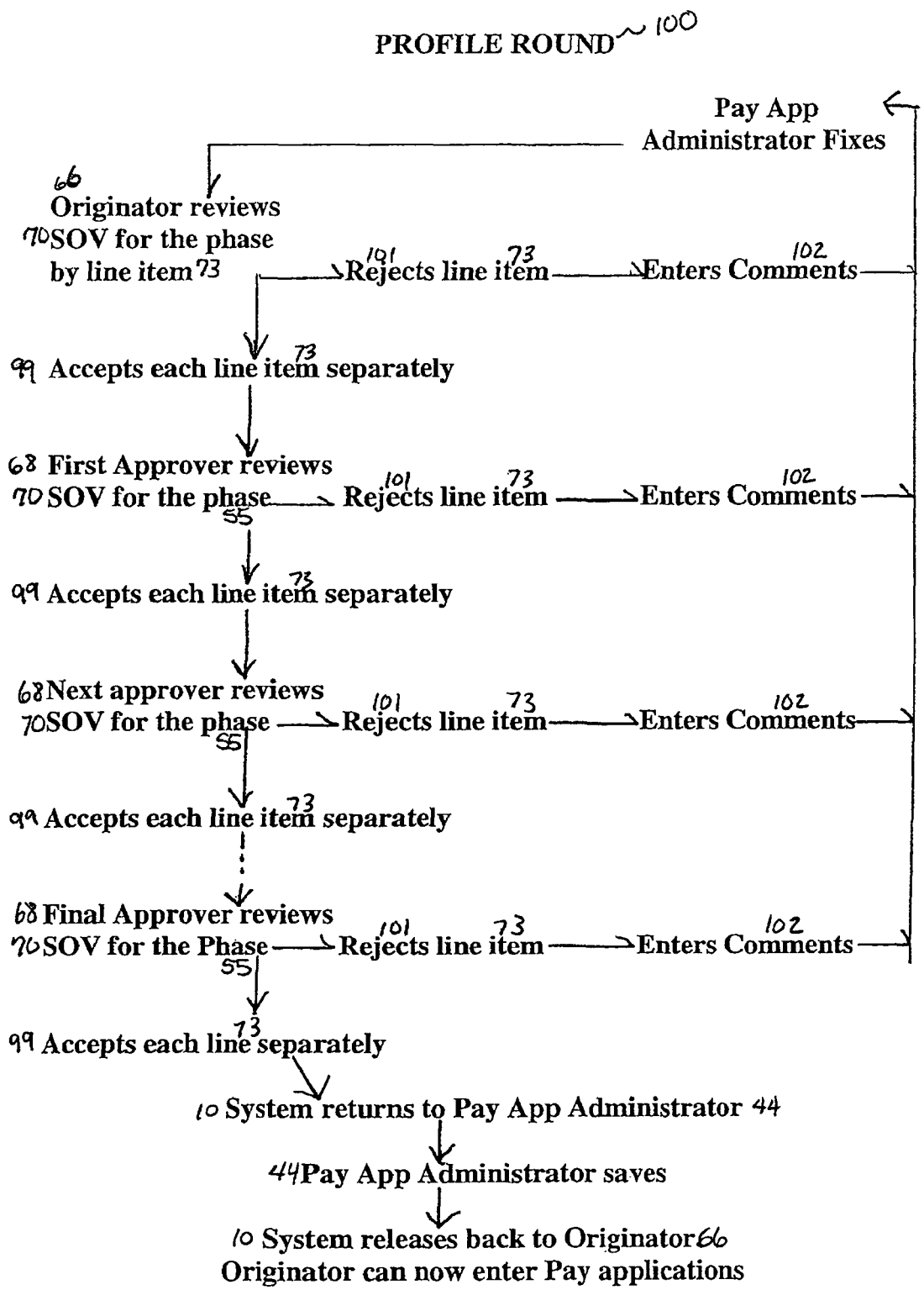
Figure 9:
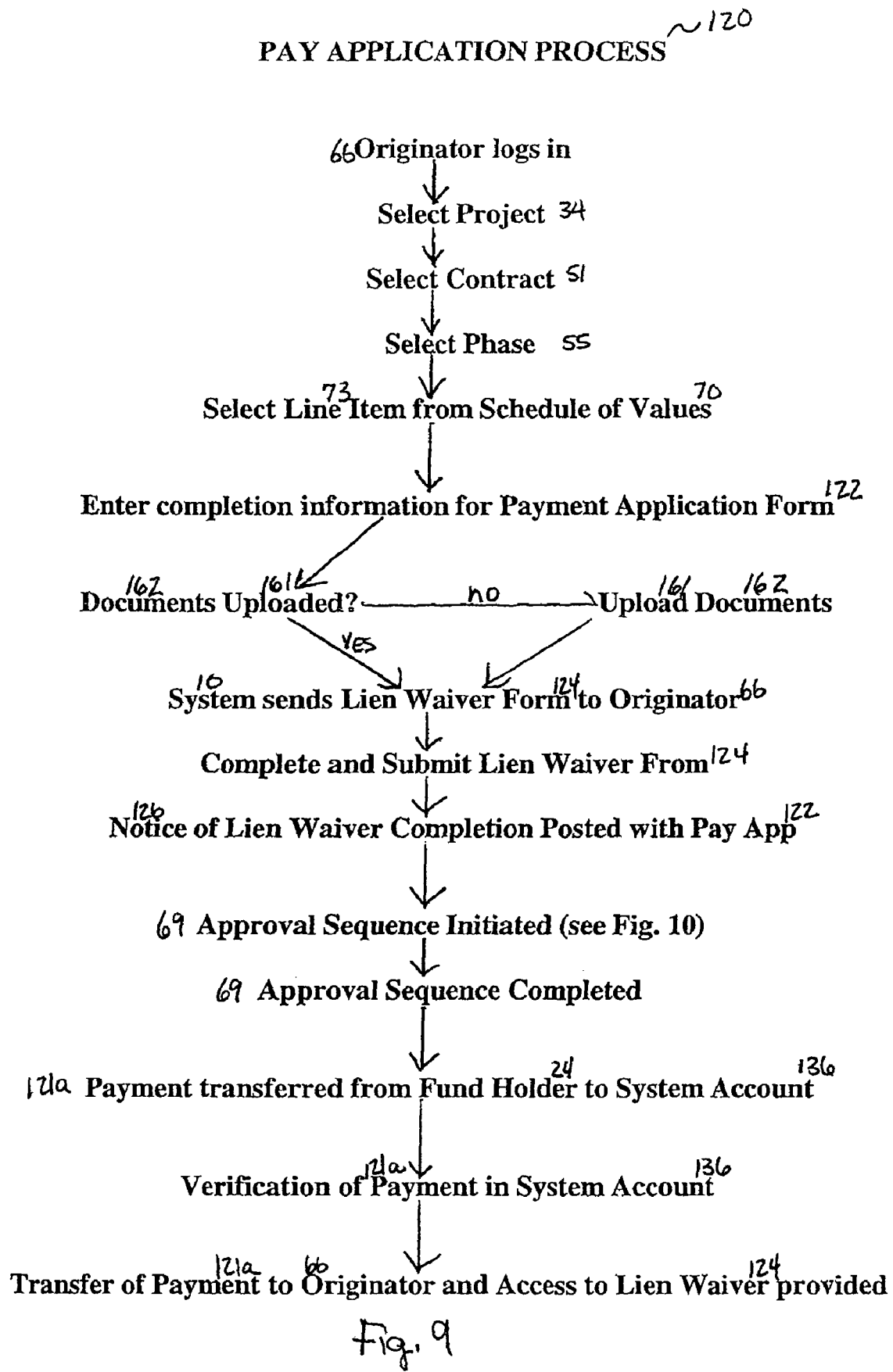
Figure 9C:
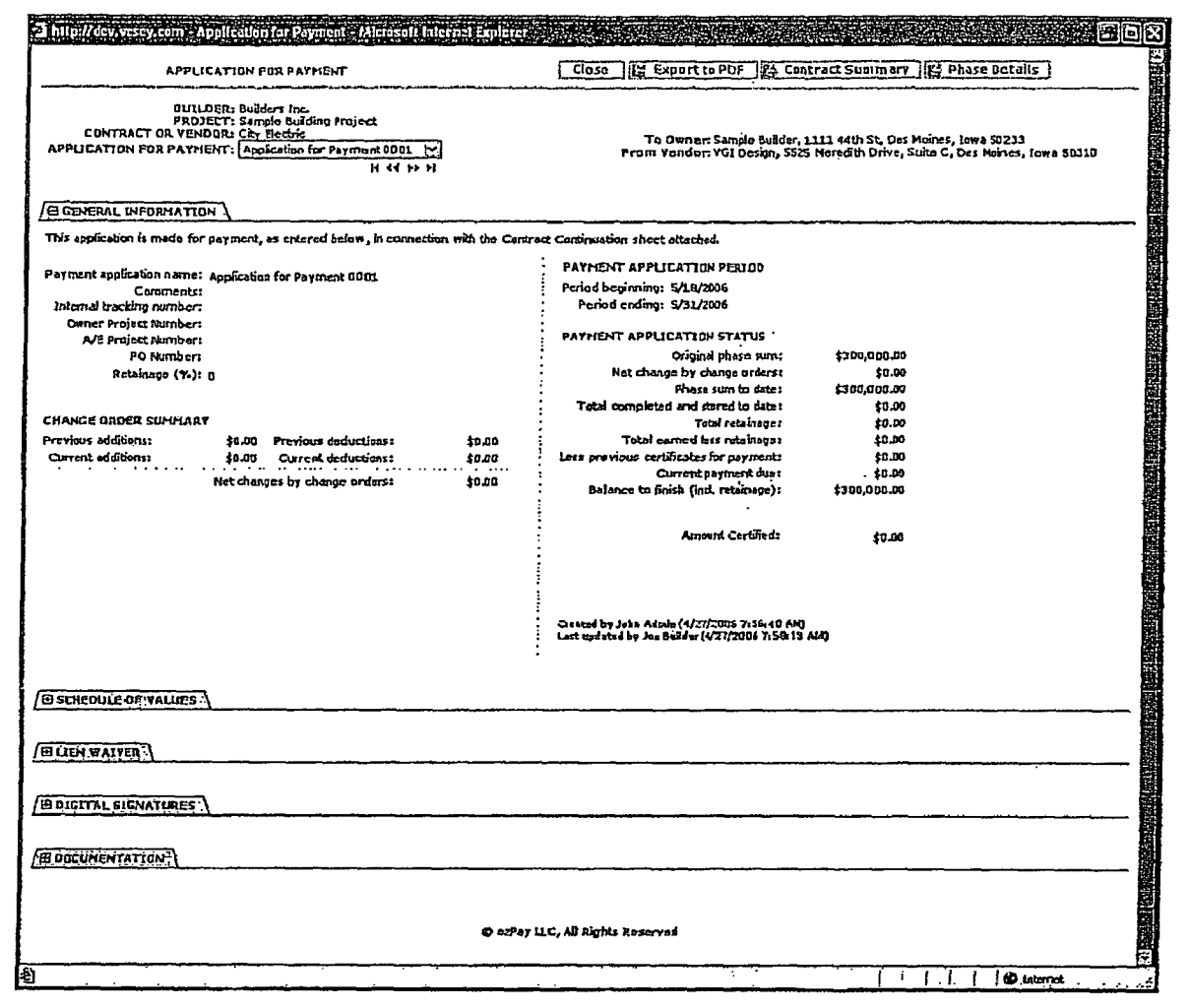
Figure 9D:
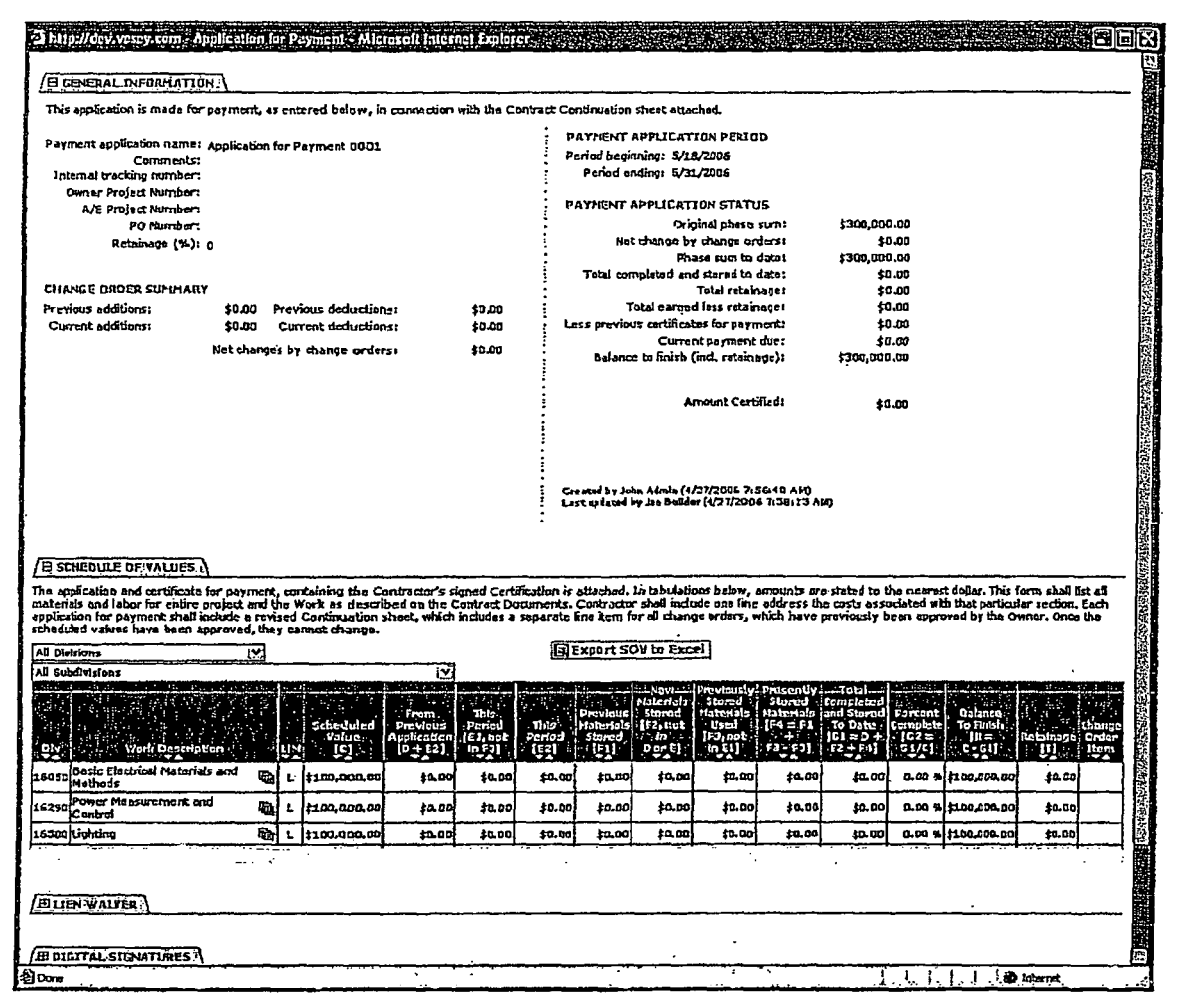
Figure 9G:
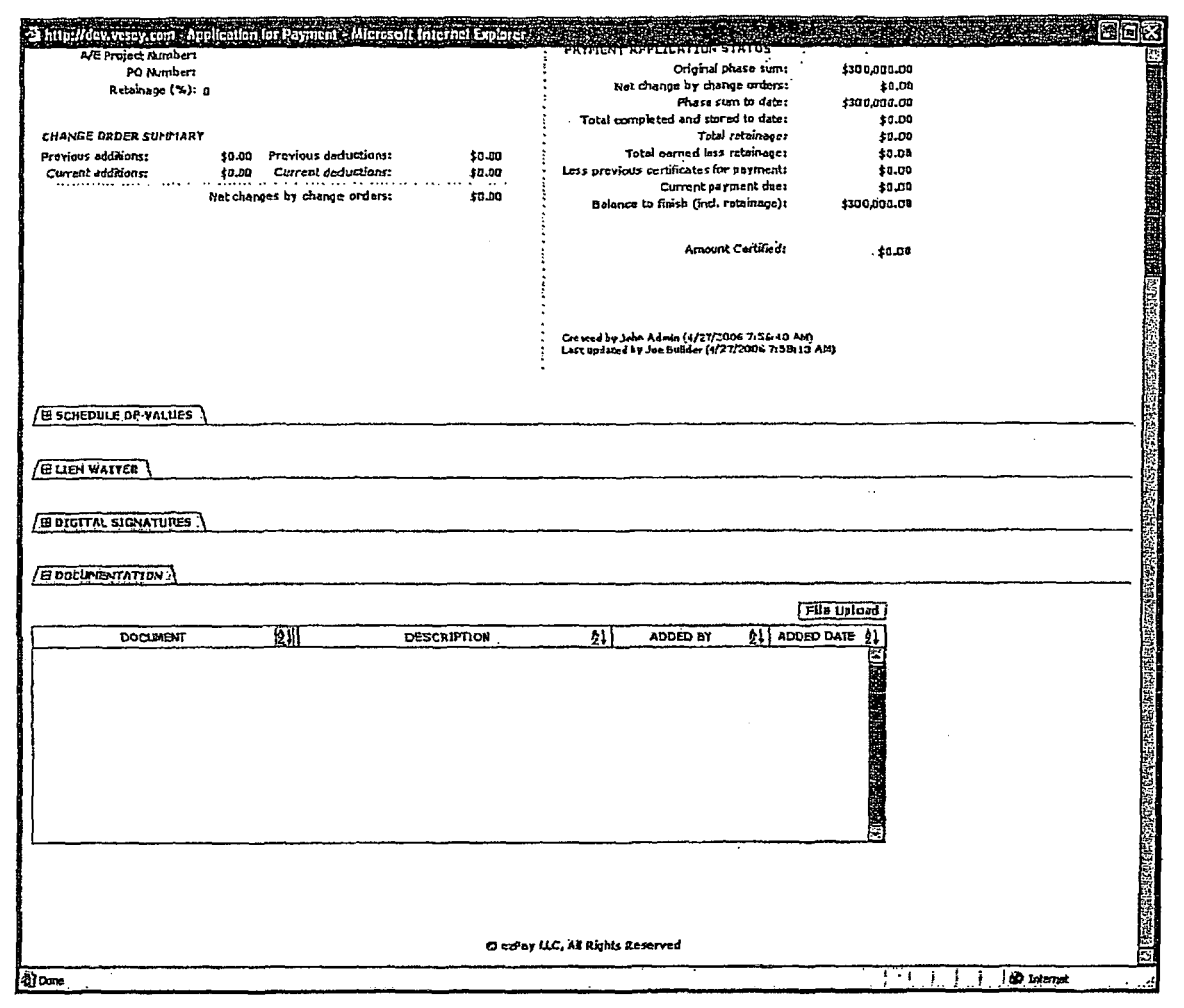
Figure 9H:
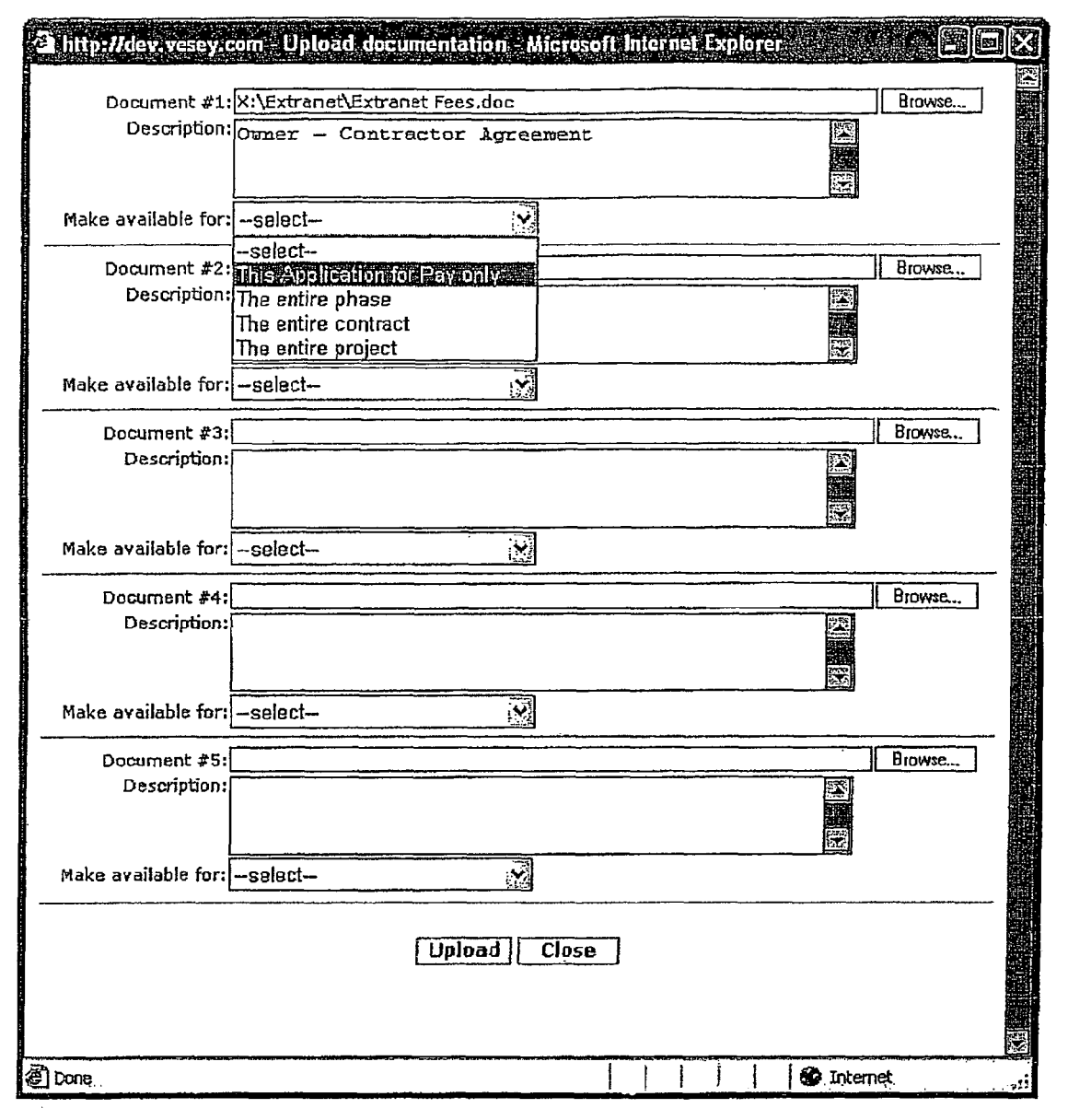

FIG. 1 Administrator's Flow Chart
FIG. 2 User's Flow Chart
FIG. 3 Approver Process Flow Chart
FIG. 4 Pay Process Flow Chart
FIG. 5 Project Set Up Flow Chart
FIGS. 5a-5j Screen shots illustrating the Project Set Up
FIG. 6 Set Up of Contracts and Phases Flow Chart
FIGS. 6a-6d Screen shots illustrating the Set Up of Contacts and Phases
FIG. 7 Schedule of Values Flow Chart
FIGS. 7a-7c Screen shots illustrating the Schedule of Values
FIG. 8 Profile Round Flow Chart
FIG. 9 Pay Application Process Flow Chart FIGS. 9a-9h Screen shots illustrating the Pay Application Process

DETAILED DESCRIPTION OF THE PREFERRED EMBODIMENT

The invention is a computer- and web-enabled multiparty, multicontract management system 10 best shown in FIGS. 1-4. The system 10 is implemented through the web by software that has certain operative functionalities found in other collaborative work software wherein an unlimited number of projects can be managed having an unlimited number of substages, tasks, and involved entities that access and interact through the system. The invention is described in terms of processes or steps some of which are initiated by the user, some of which are managed by the system. According to methods already known in the art, data entered will be checked against stored data, the system will check for data format as necessary and flag missing data where such data is critical. Communication protocols between networked computers accessing the system are used as known in the art.

As an example of a contract managed by the system 10 of the present invention, a construction project is used as illustration. Construction projects 11 often include a number of different contracts 12 each of which is made up of phases 14 which are typically task oriented. Phases require labor 16, materials 18, or both 20. The project is owned by an owner 22 and often funded by a fund holder 24 (e.g. financial institution). The entities that provide labor or materials or both are traditionally paid upon accomplishment of certain phase milestones 23 e.g. completion of a task, or portion of a task, delivery of materials, etc. In order to use the system 10 of the present invention to manage a construction project 11, the following functions must be understood and addressed: Project Set Up 30, Contracts and Phases Set Up 50, Schedule of Values 70, Profile Round 100, Change Order 110, Pay Application and Payments 120, Material Stored 82, and Reporting 300.

Project Set Up 30

The system 10 provides means for uploading of contract documents which may be viewed by various users. The Project Set Up 30 comprises means to assign multilevel, party identity-dependent accessibility 31. Means to assign multilevel accessibility 31 first requires the creation of security zones 36 and the designation of security zones 36 to certain entities. At least one entity must be designated a Super Administrator 32. The Super Administrator has the highest level of access to various parts of the system 10, is responsible for setting up a Project 34, assigning the Project 34 to one or more Security Zones 36, and setting up Administrator 38, Company 40 and User 42 accounts 43 with access to certain Security Zones 36, respectively. The Administrator 38 can also set up User 42 accounts. A Pay Application Administrator 44 is also designated and its function will be described in Contracts Set Up 50.

On a Project Form 46, the Super Administrator 32 simply enters a project name and description and designates a Security Zone 36 for the Project 34. Other details for the Project 34 can be stored here, as well. Once the Project 34 is set up, the Super Administrator 32 enters information about the Administrator(s) 38 for the Project 34 and designates the appropriate Security Zone 36. In a preferred embodiment, this information includes the Administrator's 38 name, email address, mailing address, agreement to be bound by electronic signature, and electronic signature block 49a. From here, the Administrator 38 or Super Administrator can enter User 42 information and designate an appropriate Security Zone 36 for that User 42. The system 10 then notifies each User 42 of its login 47 and password 49.

Set up of Contracts and Phases 50

Projects, Contract, Phases are interchangeable with labels such as Builder, Contract and Vendor or other such appropriate terms. Set up of Contracts and Phases 50 in the project can be simply accomplished. The Pay Application Administrator 44 first sets up the contract 51 in the Contract Set Up screen. He can then enter new Companies 40 or new Users 42 (or select from the list already in the system). The entry of a new Company or new User requires the completion of a series of data fields used for identification. In the preferred embodiment, the User profile further includes email address, position in the Company, his Logon ID, role, electronic signature block, and Security Zone access.

Once the Users 42 and Companies 40 are entered, the Pay Application Administrator 44 can go to "Phase Setup" 54 where he describes the phase 55, its duration 56, provides project numbers 57, sets up the review schedule 58 and records projected milestone dates 59, phase cost total 60, and retainage 61. Next, he designates the participants 62 for the phase 55 which include entities that can apply for payment on this phase and those that will provide approvals. Those that may apply for payment on this phase are called Originators 66. Those from whom Approval is required are called Approvers 68. Means to designate a sequence for approval 64 is provided whereby the Administrator 44 selects Approvers 68 from the participants' list 62 in the Order in which they must provide approval or rejection of this phase 55. The last Approver is often the Fund Holder 24. The system 10 also allows the Pay Application Administrator 44 to set up a list of participants that should be email notified relative to each Approver's 68 response to the application for payment, considered collectively as the Approval Sequence 69. Once the approval sequence 69 is entered, it and the other Phase information are collectively referred to as the Phase Description 65.

Schedule of Values 70

Once the approval sequence 69 has been entered, the Pay Application Administrator 44 may input all the necessary Schedule of Values 70 information. First, a category 71 and at least one subcategory 72 are chosen from a list which describes the Phase 55 in which a line item 73 of the Schedule of Values 70 will belong. Then, a selection is made whether the value 74 pertains to material 18, labor 16 or both 20, and the appropriate value 74 is inserted. The scheduled value 74 in dollars is then entered. A "Phase Description" 76 is the combination of the Contract and Phases Set Up 50 and the Schedule of Values 70. Once the Schedule of Values 70 is completed, the Pay Application Administrator 44 enters his password 49 to sign off and begins the Profile Round 100. Once the Profile Round 100 is complete (see below) the Schedule of Values screen 78 shows each line item 73 with identifying information and its scheduled value 74 along with other pertinent data including the cumulative sum of all previous pay applications collectively labeled previous application 79 as calculated by the system 10. Two columns pertaining to the Work Completed this Month 80, 81 are presented wherein one shows labor and material installed this month 80. The other shows labor and material installed plus material installed that was previously stored 81 and is followed by a number of columns pertaining to specificities of Materials Stored 82 (see Materials Stored section below). Calculated totals showing Total Completed and Stored to Date 84, Percent Completed 86, Balance to Finish 88, and Retainage Amount 90 are System-generated amounts also displayed, line by line, on the Schedule of Values 70 screen.

Retainage 90 is determined by the System 10 by applying the percentage entered at time of Contract Set Up. Retainage is released to the entities that have substantially completed their obligations to that line item when the line item on the Schedule of Values has reached "substantial completion" which, in the preferred embodiment, is set at 90%.

Profile Round 100

The Profile Round 100 follows the same approval sequence 69 as a Pay Application (to be further described in subsequent sections) will follow, however, the approval required here is not of a certain payment request but, instead, of the entire Phase Description 65. So, the Originator 66 looks at the Schedule of Values 70 on an item 73 by item basis. Means to acceptor reject each line item 100a are provided. If the line item 73 is accepted 99, the Originator inputs his password 49. If a line item 73 is rejected 101, the Originator 66 may input a comment 102 specific to that line item 73, enters his password 49, and then the profile goes back to Pay Application Administrator 44 for fix. The Approvers 68 all get a chance to reject/approve each line item 73 as well. Rejections 101 with line item-specific comments 102 are returned to the Originator 66. Once approved and signed off by last Approver 68, it is returned to Pay Application Administrator 44 to save and release back to the Originator 66.

Change Order 110

Either by responding to a Request for Proposal or when needing to initiate a required change order 110, originator 66 who is a contractor may select the Change Order screen 112 and input the requisite information 114. The Pay Administrator 44 then selects the appropriate approvers 68 and initiates an approval round 116. If the Change Order 110 is approved, it becomes an Amendment 118 to the Contract and the Pay Application Administrator 44 then adds to the Schedule of Values 70. The requisite information 114 may also be imported from an outside system.

Pay Application Process 120

After the Profile Round 100 is complete, means to apply for payment 121 are available to the Originator 66. Means to apply for payment 121 allows the Originator 66 to originate a Pay Application 122 upon completion of a Phase Milestone 23 and comprises the following steps: First, the Originator logs into the Project 34, Selects the correct Contract 51 and Phase 55. Then, the Originator 66 selects one of the line items 73 from the Schedule of Values 70 for which he is requesting a payment 121a and enters information as required by the Payment Application Form 122 including entry regarding stored materials 82 (see Stored Material section below). He completes a Lien Waiver Form 124 as automatically provided by the System 10 upon submission of the Pay Application Form 122. The Lien Waiver Form 124 includes language releasing all claims relative to the work for which payment is being requested 126 and, upon entry of the Originator's 66 password 49, the System 10 applies the Originator's 66 electronic signature 49a to the Lien Waiver 124 and sends the Pay Application Form 122 along with a notice 126 that the Lien Waiver Form 124 has been completed to the first Approver 68. The first Approver 68 verifies the payment 121 by manually keying in the dollar figure for the payment 121. If this figure does not match that in the system, the system 10 will not accept it. This requirement acts as a safety door by requiring at least one of the approvers 68 to truly look at the payment 121 being requested. The system 10 provides means for the first Approver to indicate 127 a response. If rejection 130, means to indicate 127 allows the Approver to click the box for rejection and then enter reasons 132 therefore. Next, the system 10 removes all electronic signatures 49a from this Pay Application 122 and associated Lien Waiver 124, and sends back to Originator 68 with the reasons 132 for refusal.

When the first Approver 68 indicates approval, the means to indicate 127 approval 134 provides a check box and the system 10 then emails other entities as directed by the Phase Description 65. Upon first approval 134, next Approver 68 is notified there is a Pay Application 122 awaiting his approval 134 and he utilizes means to indicate 127 approval or rejection in the same manner. All other Phase Participants 62 can determine which Approver 68 is next in line by referring to the Schedule of Values 70 screen. The final Approver 68 is the holder of the funds 24 that are available to make the payment 121. Upon his Approval, the requested payment 121 is transferred to a System Account 136. The System 10 confirms the payment 121 has arrived and is available for transfer. Upon confirmation, the System 10 direct deposits the payment 121 in an Originator's 66 account 137 and sends the completed Lien Waiver 124 to the fund holder 124. This process expedites the completion of the transaction, does not require separate completion steps or double signing by the Lien Waiver signor or the Funds Holder, and provides certainty that the funds are present and transferred at time of the transfer of the Lien Waiver and vice versa. It does not allow a contractor or other individual to control the timing of payment nor does it suffer from the possibility that funds available in the payor's account at the time the system checks have already been used before the funds can be transferred to the payee.

The Set up of Contacts and Phases and of Users may include a level deeper than described above. Here, a phase description 65 would be that of a task 142 within a phase to be completed by a vendor 140 and a schedule of values 70 would be entered accordingly. The participants list 62 would include the vendor 140 and/or subcontractors. There would be a single approver 68 in this situation the contractor for whom the vendor is providing materials/services. Upon completing the pay application form 122, the vendor 140 would be required to complete a Lien Waiver Form 124. Upon approval of the request by the approver/contractor 68, the Fund Holder 24 would release the payment 121 to the system 10, the system 10 would verify payment amount transferred, and system 10 would then forward the Lien Waiver 124 to the approver/contractor 68 and payment 121 to vendor 140. This process negates the temptation by the Contractor to hold funds while at the same time expediting the completion of the transaction without necessitating separate completion steps or double signing by the Lien Waiver signor or the Funds Holder. Controlled by Security Zones 36 and the Phase Participants List 62, the Vendor 140 would not have access to any parts of the system 10 other than the Phase and tasks 142 with which he has been linked and, then, only to request a payment 121.

Materials Stored 82

The System 10 stores and displays information regarding materials providing means to balance and report stored materials levels 144. Said means to balance and report comprises the following entry and calculated fields: Previous Materials Stored 150, New Materials Stored 152, Previously Stored Material Used 154 and Materials Presently Stored 156. A user 42 on the participants list 62 on a phase 55 can enter changes to New Materials Stored 152, and to Previously Stored Material Used 154. These columns are displayed on the Schedule of Values 70 relative to each line item 73 on the schedule 70. The Previous Material Stored 150 column shows the level of materials stored after processing the previous pay application and is a System-generated amount. Material Presently Stored 156 is a system calculated level showing the value of the materials stored past and present and for which payment has not yet been applied for. Total Completed and Stored 160 shows the value of materials obtained to date, both used and unused. In the preferred embodiment, means to balance and report stored materials levels 144 further comprises the requirement of uploading scanned document images 162 to the system 10 under the "Pay Application Support Documents" folder 164 in the Pay Application 122 tab prior to completion of a Pay Application 122. The documents 162 required include a proof of purchase 166 and an insurance certificate 168 on the location where the materials are stored. Without uploaded document images 162, the current Pay Application 122 including payment for materials will not be processed by the System 10.

Reporting

The system links all Budget Fields together and adjusts to changes in real time. For example, if a Contract or Phase is finished under budget, a field holding the actual project balance is affected as is a field holding the actual Contract or Phase budget. Another example of linked fields is illustrated when, at set up, an Administrator indicates which independent Phases or Contracts must be complete before a particular dependent Phase or Contract can be started. Any changes to the independent schedule are automatically used to update the schedule of the dependent. Such an update may be set to require approval by a specified entity and, upon such approval, the schedule change will be communicated to all affected entities by email or intra-system messaging.

Management Features

The combination of certain features in the Phase Set up, Schedule of Values and Pay application and means for automatically updating certain data fields in response to new entries in linked fields provides means for contract management. Means for contract management provides information on contract progress and cost, phase progress and cost, and change orders.

What is claim is:

1. A computer and web-enabled multiparty, multicontract project management system comprising:
   one or more computers configured to:
   a) store information required to manage at least one contract comprising at least one contract set up and at least one phase set up;
   b) assign multilevel, party-identity dependent, accessibility by unlimited authorized users wherein said users include at least one pay application originator having an account, at least one pay application approver, and a funds holder;
   c) provide and report information on contract progress, budget and costs to date, phase progress, phase budget and costs to date, change order monitoring, and payment tracking data;
   d) automatically update certain data fields in response to new entries in linked fields comprising running balance management of funds available, spent, paid, overbudget, and underbudget for any of the following: project, contract, phase, and time period;
   e) balance and report stored materials levels;
   f) record a schedule of values for each said phase;
   g) designate a sequence of a plurality of approvers for a selected phase;
   h) receive and process a request for payment from said pay application originator and a signed waiver form;
   i) notify each said approver that approval is required, allow said approver to indicate a response, indicate which approver in said sequence is required to respond next; and j) withdraw funds equal to said payment request from an account held by said funds holder, deposit said payment into an account controlled by said system and transfer said payment to the originator's account and release said signed waiver form to at least one said approver.

2. The computer and web-enabled system claimed in claim 1 wherein assignment of multilevel party-identity dependent accessibility comprises at least a single security zone at least one user, a designation of access to a security zone for each user, and generate a password and a login for each said user.

3. The computer and web-enabled system in claim 2 wherein said payment is determined based on at least one contract, a list of phases associated with said at least one contract, a schedule of values associated with each said phase comprising a scheduled value and timelines for each line item from a pay application, and a completed waiver form including an electronic signature.

4. The computer and web-enabled system in claim 3 wherein a sequence of a plurality of approvers is designated relative to a selected phase an appropriate contract, a desired phase, and a plurality of participants in the phase.

5. The computer and web-enabled system in claim 3 wherein said initiation of said sequence comprises notifying each said approver in the sequence of said completed lien waiver and recording each said approver's response to said pay application.

6. The computer and web-enabled system in claim 5 wherein said recording a response comprises addition of the electronic signature of each approver to said completed waiver form.

7. The computer and web-enabled system of claim 5 wherein said one or more computers record a payment amount provided by said first approver and to validate said payment amount.

8. The computer and web-enabled system in claim 6 wherein recording each said approvers response comprises recording a rejection, wherein if said rejection is recorded, then said one or more computers remove said originator's electronic signature and said approvers' electronic signatures from said lien waiver form, and return said pay application to originator.

9. The computer and web-enabled system of claim 1 wherein said deposit of the payment and release of said signed waiver form comprises causing the one or more computers to record a selection of a line item from the schedule of values, display the waiver form to a pay request originator in response to completion of said pay application; record completion of said waiver form; send said pay application and notice of completion of said waiver form to each approver in said sequence of approvers wherein the last of said sequence is the funds holder; and electronically store indications of approval; electronically transfer said payment to the pay request originator and release said waiver form; and notify each said pay request originator of funds deposited.

10. The computer system of claim 9 wherein said electronically storing of information required to manage at least one contract comprises electronically storing a retainage proportion to be held and completion proportion necessary for release of said retainage and said exchange further comprises calculating and holding said retainage upon approval of said pay application and releasing said retainage upon detection that line item is substantially complete.

11. The computer system of claim 1 further comprising causing the one or more computers to process a profile round for confirmation of the phase set up and the schedule of values for said phase.

12. The computer system of claim 11 wherein said payment is unavailable until said profile round is complete.

13. The computer system of claim 11 wherein said profile round comprises electronically recording approval of the schedule of values in the phase by each approver in the designated sequence of approvers.

14. The computer system of claim 12 wherein said profile round concludes upon receipt of approval by each approver.

15. The computer system of claim 1 wherein said schedule of values for each said phase comprises a category, a subcategory, and a scheduled value.

16. The computer system of claim 1 wherein said balancing and reporting of electronically stored materials level comprises calculating and providing a value of new materials stored electronically, calculating and providing a value of previously electronically stored materials used, calculating and providing a value of previous materials electronically stored after processing most recent pay application, calculating and providing a value of materials presently stored electronically for which pay application has not been made, and calculating and providing a value of total materials obtained regardless of payment.

* * * * *